(12) United States Patent
Sajadieh et al.

(10) Patent No.: US 9,647,735 B2
(45) Date of Patent: May 9, 2017

(54) HYBRID DIGITAL AND ANALOG BEAMFORMING FOR LARGE ANTENNA ARRAYS

(71) Applicant: INTEL IP CORPORATION, Santa Clara, CA (US)

(72) Inventors: Masoud Sajadieh, Fremont, CA (US); Hooman Shirani-Mehr, Portland, OR (US); Feng Xue, Redwood City, CA (US); Qinghua Li, San Ramon, CA (US)

(73) Assignee: Intel IP Corporation, Santa Clara, UT (US)

( * ) Notice: Subject to any disclaimer, the term of this patent is extended or adjusted under 35 U.S.C. 154(b) by 0 days.

(21) Appl. No.: 14/784,256

(22) PCT Filed: Dec. 12, 2013

(86) PCT No.: PCT/US2013/074747
§ 371 (c)(1),
(2) Date: Oct. 13, 2015

(87) PCT Pub. No.: WO2014/193475
PCT Pub. Date: Dec. 4, 2014

(65) Prior Publication Data
US 2016/0080051 A1   Mar. 17, 2016

Related U.S. Application Data

(60) Provisional application No. 61/829,968, filed on May 31, 2013.

(51) Int. Cl.
*H04B 7/02* (2006.01)
*H04L 1/02* (2006.01)
(Continued)

(52) U.S. Cl.
CPC ......... *H04B 7/0456* (2013.01); *H04B 7/0452* (2013.01); *H04B 7/0486* (2013.01);
(Continued)

(58) Field of Classification Search
CPC .. H04B 7/0456; H04B 7/0452; H04B 7/0486; H04L 27/20
See application file for complete search history.

(56) References Cited

U.S. PATENT DOCUMENTS

2011/0291891 A1    12/2011   Nsenga et al.
2013/0039401 A1*    2/2013   Han ................... H04B 7/0617
                                                      375/222
(Continued)

FOREIGN PATENT DOCUMENTS

CN        105144600        5/2013
WO     WO2014/193475      12/2014

OTHER PUBLICATIONS

Alcatel-Lucent Shanghai Bell et al., Considerations on CSI Feedback Enhancements for High-Priority Antenna Configurations, Aug. 2011, R1-112420, 3GPP TSG-RAN WG1 #66, Athens, Greece, 22-26.*

(Continued)

*Primary Examiner* — Wednel Cadeau
(74) *Attorney, Agent, or Firm* — Thorpe North & Western

(57) ABSTRACT

A hybrid digital and analog beamforming device for a node operable with an antenna array is disclosed. In an example, the hybrid digital and analog beamforming device can include computer circuitry configured to: Segment antenna elements of an antenna array into at least two groups of antenna elements; map antenna ports for transmission chains to one group of the antenna elements; constrain digital precoding weights for a digital precoder for the antenna elements, where the digital precoding weight includes a (Continued)

digital phase and amplitude; and determine analog precoding weights for an analog precoder for the antenna elements, where the analog precoding weight includes an analog phase.

20 Claims, 12 Drawing Sheets

(51) Int. Cl.
| | |
|---|---|
| *H04B 7/0456* | (2017.01) |
| *H04B 7/06* | (2006.01) |
| *H04B 7/04* | (2017.01) |
| *H04W 12/02* | (2009.01) |
| *H04W 48/16* | (2009.01) |
| *H04W 28/02* | (2009.01) |
| *H04B 7/0452* | (2017.01) |
| *H04L 27/20* | (2006.01) |
| *H04W 92/24* | (2009.01) |
| *H04W 4/00* | (2009.01) |
| *H04W 76/02* | (2009.01) |

(52) U.S. Cl.
CPC ........... *H04B 7/063* (2013.01); *H04B 7/0617* (2013.01); *H04B 7/0626* (2013.01); *H04B 7/0632* (2013.01); *H04B 7/0639* (2013.01); *H04L 27/20* (2013.01); *H04W 4/005* (2013.01); *H04W 12/02* (2013.01); *H04W 28/0289* (2013.01); *H04W 48/16* (2013.01); *H04W 92/24* (2013.01); *H04W 76/023* (2013.01)

(56) References Cited

U.S. PATENT DOCUMENTS

| | | | |
|---|---|---|---|
| 2013/0039445 A1 | 2/2013 | Hwang | |
| 2013/0286960 A1* | 10/2013 | Li | H04W 72/042 370/329 |
| 2014/0341048 A1 | 11/2014 | Sajadieh et al. | |

OTHER PUBLICATIONS

Alcatel-Lucent Shanghai Bell et al., Considerations on CSI Feedback Enhancements for High-Priority Antenna Configurations, Aug. 2011 R1-112420, 3GPP TSG-RAN WG1 #66, Athens, Greece, 22-26).*

Alcatel-Lucent Shanghai Bell, et al., 'Considerations on CSI feedback enhancements for high-priority atenna configurations', R1-112420,3GPP TSG-RAN WGI #66, Athens, Greece, Aug. 22-26, 2011 (http://www.3gpp.org/ftp/tsg_ran/wgllrl/TSGR1_66/Docs/) See paragraphs 44, 45: and figures 1, 2.

$3^{rd}$ Generation Partnership Project; Technical Specification Group Radio Access Network; Evolved Universal Terrestrial Radio Access (E-UTRA); Physical Channels and Modulation (Release 11) 3GPP TS 36.211; V11.2.0 (Feb. 2013).

$3^{rd}$ Generation Partnership Project; Technical Specification Group Radio Access Network; Evolved Universal Terrestrial Radio Access (E-UTRA); Physical Channels and Modulation (Release 11) 3GPP TS 36.212; V11.2.0 (Feb. 2013).

$3^{rd}$ Generation Partnership Project; Technical Specification Group Radio Access Network; Evolved Universal Terrestrial Radio Access (E-UTRA); Physical Channels and Modulation (Release 11) 3GPP TS 36.213; V11.2.0 (Feb. 2013).

Ahmed Alkhateeb et al . . . 'Hybird Precoding for Millimeter Wave Cellular Systems with Partial Channel Knowledge', In; Proc. of the Information Theory and Applications (ITA), San Diego, CA, Feb. 10-15, 2013 (http://ita.ucsd.edu/wkrkshop/13/files/paper/paper_430.pdf) See pp. 2,3; and figure2.

\* cited by examiner

SISO

SIMO

MISO

MIMO

HYBRID DIGITAL AND ANALOG BEAMFORMING FOR LARGE ANTENNA ARRAYS

RELATED APPLICATIONS

This application claims the benefit of and hereby incorporates by reference U.S. Provisional Patent Application Ser. No. 61/829,968, filed May 31, 2013.

BACKGROUND

Wireless mobile communication technology uses various standards and protocols to transmit data between a node (e.g., a transmission station or a transceiver node) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), the IEEE 802.11 standard, which is commonly known to industry groups as WiFi, or Wireless Gigabit (WiGig) Alliance. WiGig is a trade association that develops and promotes the adoption of multi-gigabit speed wireless communications technology operating over an unlicensed 60 GHz frequency band. WiGig alliance was subsumed by the WiFi Alliance and promotes the IEEE 802.11 ad protocol.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicate with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

The eNB can have multiple antennas used for transmission to the UEs, allowing the eNB to use multiple-input and multiple-output (MIMO). MIMO is a smart antenna technology that refers to the use of multiple antennas at both the transmitter and receiver to improve communication performance, where input and output refer to a radio channel carrying the signal, not necessarily to the devices having antennas. In the existing LTE specification (e.g., 3GPP LTE technical specifications (TS) Release 10), up to eight transmit or receive antennas can be used, or up to eight channels can be used for transmission of a resource.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
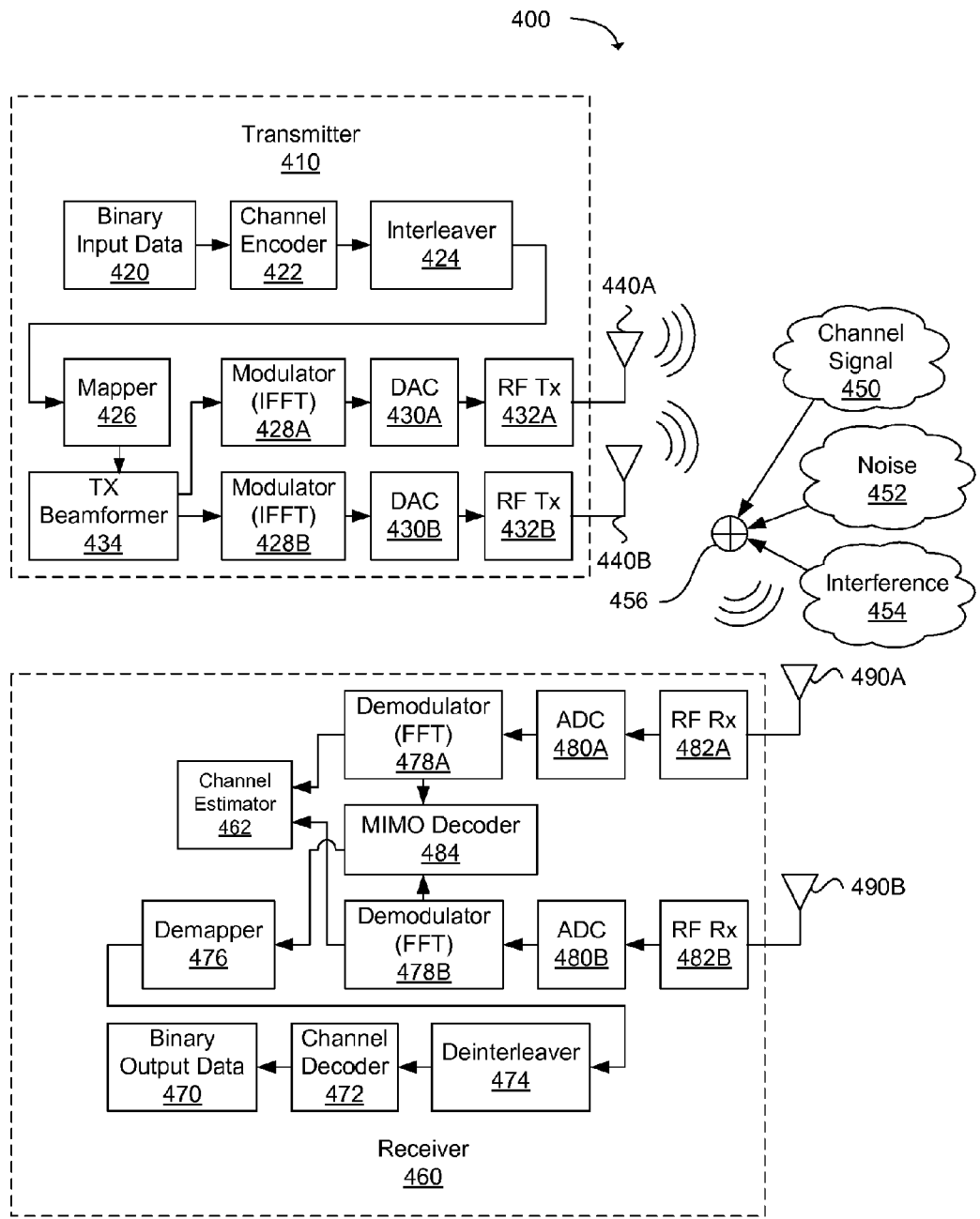
FIG. 1 illustrates a block diagram of the physical layer of a transmitter and receiver in an orthogonal frequency-division multiplexing (OFDM) wireless network in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A wireless communication system can be subdivided into various sections referred to as layers. In the LTE system, communication layers can include the physical (PHY), media access control (MAC), radio link control (RLC), packet data convergence protocol (PDCP), and radio resource control (RRC) layers. The physical layer can include the basic hardware transmission components of a wireless communication system 400, as illustrated in FIG. 1. A basic multiple-input multiple-output (MIMO) system is used for simplicity in illustrating the basic hardware transmission components, but the components can also be adapted for a complex MIMO system, a single-input and single-output (SISO) system, or similar system. For example in a MIMO system, at the transmitter 410, binary input data 420 can be protected through encoding using a channel encoder 422, interleaved against fading phenomenon using an interleaver 424, and mapped to improve reliability using a mapper 426. The mapped data can be separated into layers for antenna ports by a transmitter (TX) beamformer 434 and the layers can be OFDM modulated into OFDM symbols using modulators 428A-B. The modulators can use an inverse fast Fourier transform (IFFT) algorithm to compute the inverse discrete Fourier transform (IDFT) to generate modulated signals (vector x for each antenna port). The modulated signals can be converted to analog signals with digital-to-analog converters (DACs) 430A-B. The analog signals can be transmitted via radio frequency (RF) transmitters (Txs) 432A-B configured to send the signal to transmitter antennas 440A-B operable to communicate the signal. The analog signals will follow a path referred to as a channel. The analog signals travelling through that path can be referred to as a channel signal 450. The physical layer can include other components (not shown), such as series-to-parallel (S/P) converters, parallel-to-serial (P/S) converters, cyclic prefix (CP) inserters and deleters, guardband inserters and deleters, and other desired components.

The transmitted channel signal 450 can be subject to noise 452 and interference 454. The interference can include intra-cell interference and intercell interference. Intra-cell interference can refer to interference from other channel signals transmitted within the cell of the transmitter 410. Intercell interference can refer to interference from other channel signals transmitted by neighboring cells. The noise and interference is represented as an addition 456 to the channel signal, which can be received by receiver antennas 490A-B and one or more radio frequency (RF) receivers (Rxs) 482A-B at the receiver 460. The channel signal combined with the noise and interference can be converted to a digital modulated signal with analog-to-digital converters (ADCs) 480A-B. The digital signal can be OFDM demodulated using demodulators 478A-B. The demodulators can use a fast Fourier transform (FFT) algorithm to compute the discrete Fourier transform (DFT) to generate demodulated signals (vector y for each antenna port). A channel estimator 462 can use the demodulated signal to estimate the channel 450 and the noise and interference that occurs in the channel. The channel estimator can include a feedback generator or be in communication with the feedback generator, which can generate a physical uplink shared channel (PUSCH) feedback report, such as a channel quality indicator (CQI) report, a precoding matrix indicator (PMI) report, or a transmission rank indicator (RI) report. The CQI can be used to assist the MIMO transmissions modes. The demodulated signals can be combined using a MIMO decoder 484, demapped using a demapper 476, deinterleaved using a deinterleaver 474, and decoded by a channel decoder 472 to generate binary output data 470 that can be used by other layers of the receiving station.

Figure 2:
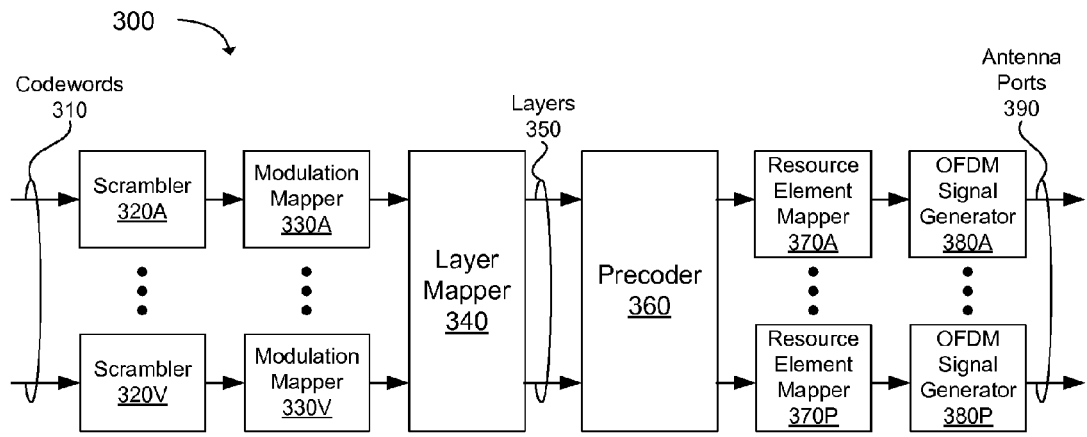
FIG. 2 illustrates a block diagram of physical channel processing of a physical channel processor in accordance with an example.

FIG. 2 illustrates additional details related to the interleaver 424, the mapper 426, the transmitter beamformer 434, and the modulators 428A-B of the physical channel processor shown in FIG. 1 for an LTE MIMO mobile communication system. Corresponding features can also exist on the receiver 460. The MIMO physical channel processor 300 of FIG. 2 can include scramblers 320A-V, modulation mappers 330A-V, a layer mapper 340, a precoder 360, resource element mappers 370A-P, and OFDM signal generators 380A-P. The scramblers can scramble each of the codewords 310 into coded bits to be transmitted on a physical channel. Modulation mappers can modulate scrambled bits to generate complex-valued modulation symbols. A layer mapper can map the modulation symbols onto a plurality of transmission layers 350. The precoder can precode the modulation symbols on each layer for transmission on antenna ports 590. The procoder can use a codebook known both at the transmitter (e.g., eNB) and the receiver (e.g., UE) or be calculated at the transmitter and transferred to or learned at the receiver. The codebook can define a set of vectors and matrices at both the transmitter and the receiver, which can achieve a high precoding gain, lower feedback overhead, and provide flexibility to support various antenna configurations and different numbers of data streams. The resource element mappers can map the modulation symbols for each antenna port to resource elements (REs). The OFDM signal generator can generate a complex-valued time-domain OFDM signal for each antenna port.

Figure 3:
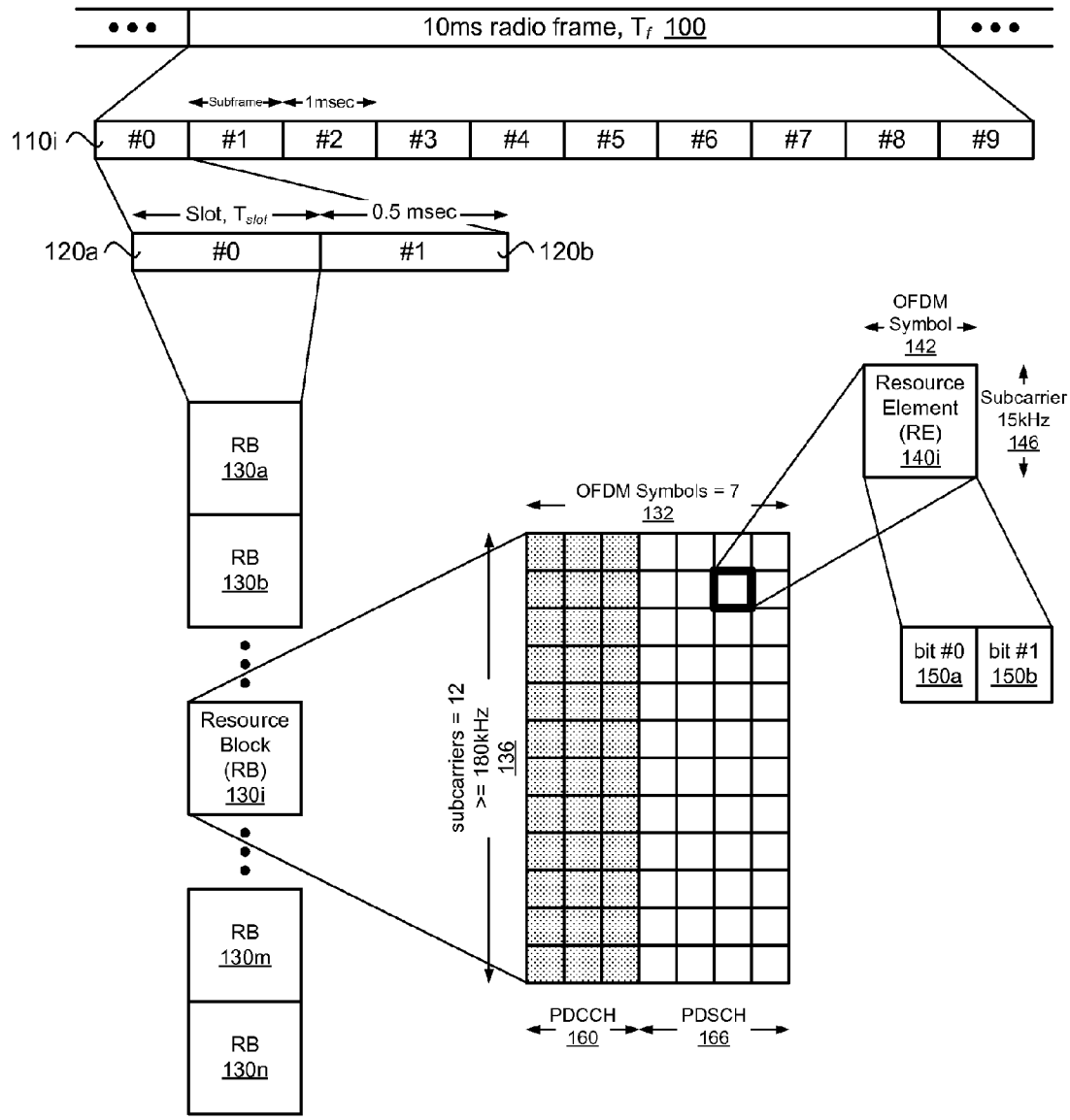
FIG. 3 illustrates a diagram of radio frame resources (e.g., a resource grid) for a downlink (DL) transmission including a legacy physical downlink control channel (PDCCH) in accordance with an example.

In one example, the resource elements (REs) can represent elements of a radio frame structure transmitted on the physical (PHY) layer in a downlink transmission between a node (e.g., eNodeB) and the wireless device (e.g., UE) using a generic 3GPP long term evolution (LTE) frame structure, as illustrated in FIG. 3.

FIG. 3 illustrates a downlink radio frame structure type 1. In the example, a radio frame 100 of a signal used to transmit the data can be configured to have a duration, Tf, of 10 milliseconds (ms). Each radio frame can be segmented or divided into ten subframes 110i that are each 1 ms long. Each subframe can be further subdivided into two slots 120a and 120b, each with a duration, Tslot, of 0.5 ms. The first slot (#0) 120a can include a legacy physical downlink control channel (PDCCH) 160 and/or a physical downlink shared channel (PDSCH) 166, and the second slot (#1) 120b can include data transmitted using the PDSCH.

Each slot for a component carrier (CC) used by the node and the wireless device can include multiple resource blocks (RBs) 130a, 130b, 130i, 130m, and 130n based on the CC frequency bandwidth. The CC can have a carrier frequency having a bandwidth and center frequency. Each subframe of the CC can include downlink control information (DCI) found in the legacy PDCCH. The legacy PDCCH in the control region can include one to three columns of the first OFDM symbols in each subframe or physical RB (PRB), when a legacy PDCCH is used. The remaining 11 to 13 OFDM symbols (or 14 OFDM symbols, when legacy PDCCH is not used) in the subframe may be allocated to the PDSCH for data (for short or normal cyclic prefix).

The control region can include physical control format indicator channel (PCFICH), physical hybrid automatic repeat request (hybrid-ARQ) indicator channel (PHICH), and the PDCCH. The control region has a flexible control design to avoid unnecessary overhead. The number of OFDM symbols in the control region used for the PDCCH can be determined by the control channel format indicator (CFI) transmitted in the physical control format indicator channel (PCFICH). The PCFICH can be located in the first OFDM symbol of each subframe. The PCFICH and PHICH can have priority over the PDCCH, so the PCFICH and PHICH are scheduled prior to the PDCCH.

Each RB (physical RB or PRB) 130$i$ can include 12-15 kHz subcarriers 136 (on the frequency axis) and 6 or 7 orthogonal frequency-division multiplexing (OFDM) symbols 132 (on the time axis) per slot. The RB can use seven OFDM symbols if a short or normal cyclic prefix is employed. The RB can use six OFDM symbols if an extended cyclic prefix is used. The resource block can be mapped to 84 resource elements (REs) 140$i$ using short or normal cyclic prefixing, or the resource block can be mapped to 72 REs (not shown) using extended cyclic prefixing. The RE can be a unit of one OFDM symbol 142 by one subcarrier (i.e., 15 kHz) 146.

Each RE can transmit two bits 150$a$ and 150$b$ of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

Reference signals can be transmitted by OFDM symbols via resource elements in the resource blocks. Reference signals (or pilot signals or tones) can be known signals used for various reasons, such as to estimate a channel and/or noise in the channel. Reference signals can be received and transmitted by transmitting stations and mobile communication devices. Different types of reference signals (RS) can be used in an RB. For example, in LTE systems, downlink reference signal types can include a cell-specific reference signal (CRS), a multicast\broadcast single-frequency network (MBSFN) reference signal, a UE-specific reference signal (UE-specific RS or UE-RS) or a demodulation reference signal (DMRS), positioning reference signal (PRS), and a channel-state information reference signal (CSI-RS). The CSI-RS can be used for downlink channel quality measurements.

Figure 4A:
FIG. 4A illustrates a block diagram of a single-input single-output (SISO) wireless network in accordance with an example.
Figure 4B:
FIG. 4B illustrates a block diagram of a single-input multiple-output (SIMO) wireless network in accordance with an example.
Figure 4C:
FIG. 4C illustrates a block diagram of a multiple-input single-output (MISO) wireless network in accordance with an example.
Figure 4D:
FIG. 4D illustrates a block diagram of a multiple-input multiple-output (MIMO) wireless network in accordance with an example.

FIG. 4A illustrates a wireless communication system using a single radio channel on a transmitting antenna port 810 and a single radio channel on receiving antenna port 830, which can be called a single-input single-output (SISO) wireless network. FIG. 4B illustrates a wireless communication system using a single radio channel 810 on a transmitting antenna port and multiple radio channels on a number of receiving antenna ports 840, which can be called a single-input multiple-output (SIMO) wireless network. FIG. 4C illustrates a wireless communication system using multiple radio channels on a number of transmitting antenna ports 820 and a single radio channel on a receiving antenna port 830, which can be called a multiple-input single-output (MISO) wireless network. FIG. 4D illustrates a wireless communication system using multiple radio channels on a number of transmitting antenna ports 820 and multiple radio channels on a number of receiving antenna ports 840, which can be called a multiple-input multiple-output (MIMO) wireless network. The terms input and output typically refers to the radio channel carrying the signal, and not to the devices having antennas.

A MIMO wireless network can be used for beamforming. Beamforming or spatial filtering is a signal processing technique used in antenna arrays for directional signal transmission or reception. Beamforming can be achieved by combining elements in a phased array in such a way that signals at particular angles experience constructive interference while others experience destructive interference. Beamforming can be used at both the transmitting and receiving ends in order to achieve spatial selectivity.

Cellular data demand continues to experience an increasing growth rate. Combined with the scarcity of available bandwidth, wireless and cellular systems can use MIMO to deliver drastically increased spectral efficiencies to address the capacity demand. Single-user (SU) and multi-user (MU) MIMO systems are integral parts of 3GPP Long Term Evolution (LTE) specifications with antenna dimensions of up to eight antennas in a base-station (e.g., eNodeB). However, an order of magnitude increase in the number of transmit antennas, known as massive MIMO or full-dimension MIMO, can result in significantly higher spectral efficiency.

In a multi-user MIMO (MU-MIMO) system, the aggregate users' rates (e.g., sum-rate capacity or the capacity rate of all the actives users) can increase linearly with the number of transmit (Tx) antennas, assuming channel state information (CSI) is available at the transmitter. For example, in the frequency-division duplex (FDD) mode of an LTE system, the user equipment (UE) can send CSI back to the eNodeB to inform the eNodeB of different measures of the channel quality. The UE can compute CSI from the reference signals (RS) embedded in the transmitted physical resource blocks (PRB). Channel measurements and feedback can be provided over up to eight antenna ports for various standards, such as LTE-Advanced frequency-division duplex (FDD) specifications (e.g, 3GPP LTE technical specification (TS) 36.213 and TS 36.211 Release 10).

Using massive MIMO or large antenna arrays, cellular wireless systems can assist in meeting data demands with scarce spectrum resources. Increasing spatial dimensions at the transmitter of a node (e.g., eNB) can deliver substantially enhanced spectral efficiencies by enabling a greater number of users to be served simultaneously through multi-user MIMO (MU-MIMO) processes.

However, a larger number of transmit antennas can increase network throughputs if various issues are not addressed, such as cost, hardware complexity, signaling overhead, and inter-user interference. The 3GPP LTE specification can use up to 8 antennas at the eNodeB transmitter and support a limited MU-MIMO order, such as up to 2 users at the same time.

The technology (e.g., nodes, methods, computer circuitry, and systems) as described herein can provide innovative techniques to resolve practical aspects of many transmit antennas using existing codebook design to increase network capacity. The technology described herein can use massive MIMO beamforming to provide transmission with more than 8 antennas but use hardware and signaling complexities of an 8-antenna MIMO framework. Beamforming processing can operate both in the digital baseband and the analog radio frequency (RF) domains, where analog beamforming includes RF phase shifters. Digital beamforming can be frequency-selective, while analog beamforming can be wideband and operate over an entire signal band.

Limiting transmission of channel state information (CSI) to 8 antenna ports, which can imply use of 8 dedicated analog and/or RF chains, can reduce hardware costs and complications associated with many RF chains (e.g., more than 8 RF chains) and maximize compatibility with the existing specifications (e.g., LTE). Thus, existing features (e.g., codebooks) of the existing LTE-Advanced (LTE-A) specifications (i.e., 3GPP LTE specification Release 10 and higher) can be used. As a result, higher dimension MIMO (e.g., greater than 8 antennas) can implemented without a commensurate increase in the number of dedicated RF chains. A RF chain (or transmission chain or transmitter (Tx) chains) can refer to the process of converting a bit stream into a RF transmitted signal for a transmitter antenna.

Figure 5:
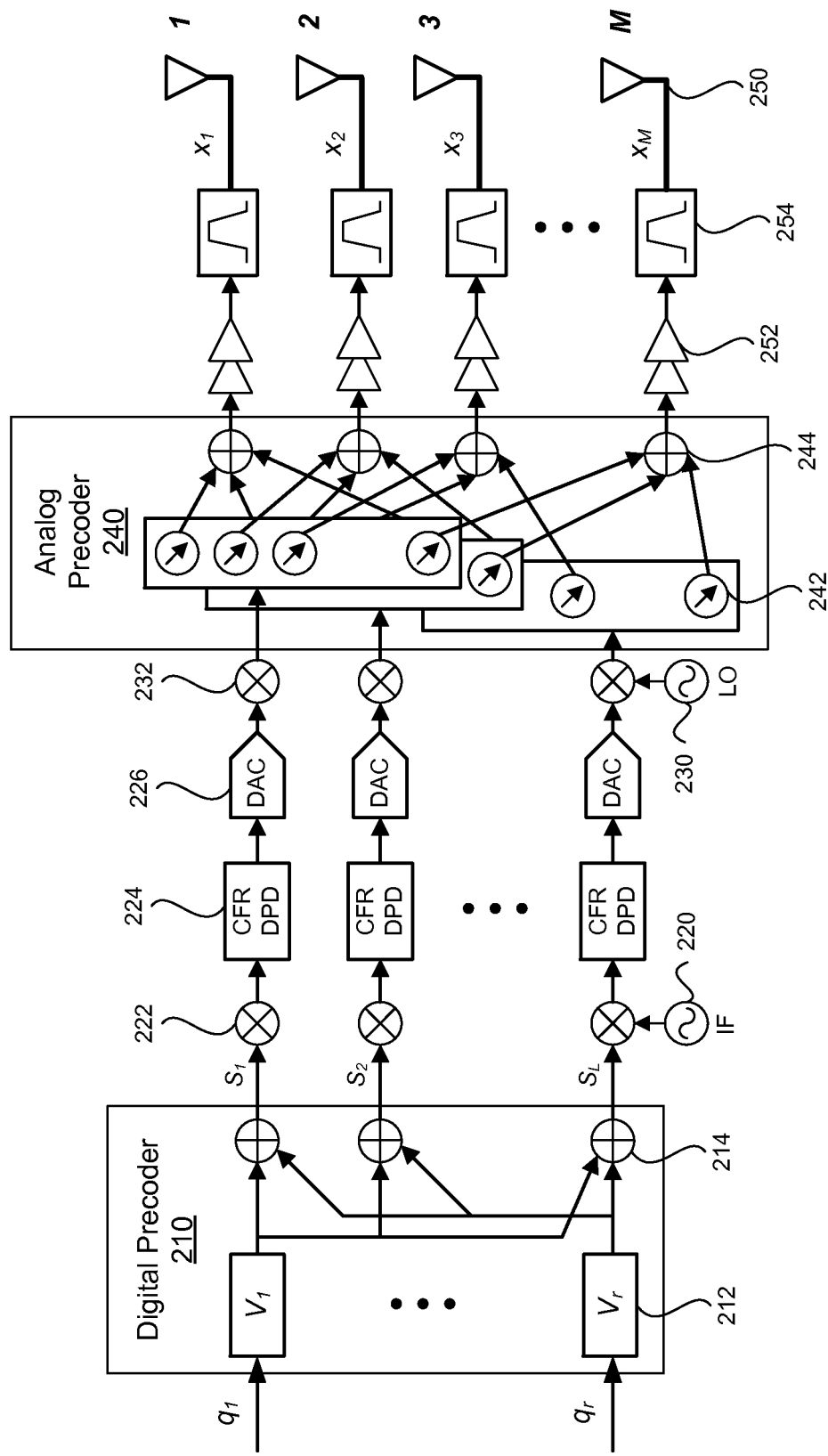
FIG. 5 illustrates a diagram of beamforming for 16 antennas using 8 transmitter (Tx) chains in accordance with an example.

FIG. 5 illustrates a high level diagram of hybrid digital and analog beamforming which can be used for both co-polarized (co-pol) and cross-polarized (cross-pol) antennas in an antenna array. A data stream can be transmitted to a digital precoder 210 in codewords $q_1 \ldots q_r$ for an integer rank r (or each RF chain). The rank of the transmission can be the number of layers transmitted. A layer can be number of different data streams generated by spatial multiplexing, where each data stream can be transmitted on a transmit antenna of the node.

The digital precoder 210 can include weights 212 for each selected frequency (e.g., $V_1 \ldots V_r$) and combiners 214. The digital precoder can generate a digital precoded signal $S_1 \ldots S_L$ for integer layer L (or each RF chain). The digital precoded signal can be converted to an analog signal for transmission through various processes. For example, the digital precoded signal can be mixed (or modulated) with an intermediate frequency (IF) oscillator 220 using a mixer 222. The IF can be a frequency to which a carrier signal is shifted as an intermediate step in transmission or reception. The IF can provide better signal processing at a lower frequency than the carrier frequency and provide improve frequency selectivity. The carrier signal frequency can be a combination of the IF and a local oscillator (LO) signal frequency.

The crest factor reduction (CFR) and digital pre-distortion (DPD) module 224 can reduce the crest factor and digital distortion for each RF chain. Crest factor is a measure of a waveform, such as alternating current (AC), showing the ratio of peak values to the average value. The crest factor can indicate how extreme the peaks are in a waveform. Modulation techniques that have smaller crest factors usually transmit more bits per second than modulation techniques that have higher crest factors. Orthogonal frequency-division multiplexing (OFDM) can have a high crest factor, so the CFR DPD module can be used reduce the crest factor for the OFDM signal. A digital-to-analog converter (DAC) 226 can convert digital data (e.g., the processed digital precoded signal) into an analog signal (e.g., current, voltage, or electric charge) for transmission. The output of the DAC can be mixed (or modulated) with a LO 230 using a mixer 232 to generate a carrier signal.

An analog precoder 240 can phase shift each of the RF chains. The analog precoder can include phase shifters 242 and combiners (or adders) 244. The output of the analog precoder can be amplified (e.g., by an amplifier 252) and filtered (e.g., by a bandpass filter 254) and transmitted as a transmitted RF signal (e.g., $x_1 \ldots x_M$) via one of M transmitter antenna 250 (or antenna element). The number of RF chains (e.g., r or L) can differ from the number of transmitter (Tx) antennas (e.g, M). In an example, the number of transmitter antennas can be greater than the number of RF chains. For instance, 8 RF chains can be used with 16 the transmitter antennas.

The antennas can be organized in an array of antennas with multiple rows or columns of antennas. The antennas in the antenna array can be configured with various polarizations, such as co-polarized and cross-polarized antennas. Polarization describes how the electric-field is moving when it leaves the antenna. Polarization can include horizontal polarization, vertical polarization, or circular polarization. Antennas with the same polarization can be considered as co-polarized antennas. Cross-polarization refers to radiation that is orthogonal to the desired polarization. For instance, the cross-polarization of a vertically polarized antenna can have horizontally polarized fields. Cross-polarized antennas can allow for more antennas and signal throughput within a fixed bandwidth and with decreased interference. For example, two adjacent channels can interfere with each other in a minimal way if the channels are oppositely polarized.

Beamforming can be divided into a digital baseband precoder 210 and analog precoder 240. W can be a desired beamforming weight or a desired PMI. Various precoding alternatives or assignments for the digital precoder and analog precoder can be used for both co-polarized and cross-polarized antennas based on the antenna array configuration. The weights of a digital precoding block can be denoted by V, and the weights of an analog precoding block can be denoted by F. The technology described herein can be used to obtain precoding weights for an entire antenna array using a smaller number of dedicated Tx chains, such as 8 Tx chains for 16 antennas. The technology can be applied to any number of antennas greater than 8, as well as 2, 4, or 8 logical antenna ports. In an example, a number of baseband transceivers can be limited to four.

The examples in FIGS. 6-11 illustrate a case of 16 transmitter (Tx) antennas in various configurations based on channel state information reference signal (CSI-RS) framework or feedback using 8 antennas. The CSI-RS framework can use existing LTE-A feedback and codebooks.

For co-polarized antennas, precoding can be based on single stage CSI feedback or multiple stage CSI feedback. For illustration, beamforming training based on one-stage and two-stage CSI is shown for 16 antennas using 8 Tx chains. But in other example, the number of antennas and Tx chains can be different.

Figure 6:
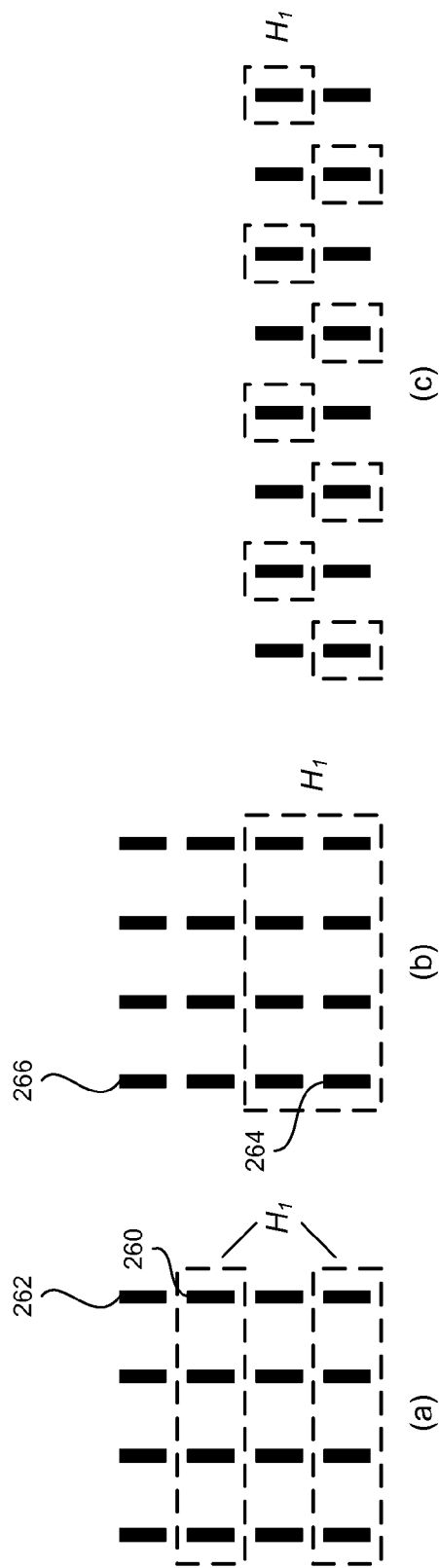
FIG. 6 illustrates a diagram of single-stage channel state information (CSI) feedback for co-polarized (co-pol) antennas in a 4×4 antenna array and an 8×2 antenna array in accordance with an example.

FIG. 6 illustrates a diagram of single-stage CSI feedback for co-pol antennas. FIGS. 6(a) and 6(b) illustrate a 4×4 antenna array and FIG. 6(c) illustrates an 8×2 antenna array. An array response for 8 antenna elements can be calculated from a single CSI-RS estimation and feedback based on 8 antenna ports, and the remainder of array response can be interpolated. Interpolation can be more accurate with a strong correlation among the adjacent antenna elements. Strong correlation can be due to closer spacing between the adjacent antenna elements, which can imply that single-stage CSI can beneficial for closely-spaced antenna arrays, such antenna arrays with $\lambda/2$ inter-element spacing (or less than $\lambda$), where $\lambda$ is the wavelength of a signal for a radio band transmitted by the node.

FIG. 6(a) illustrates 8 mapped antenna ports $H_1$ to 8 antenna elements 260 and 8 unmapped antenna elements 262 in a 4×4 antenna array, where rows of mapped antenna elements are separated by rows of unmapped antenna elements. The mapping to antenna ports $H_1$ can use various mapping, such as blocks of rows or columns, a pattern of rows or columns in a same group, or a zigzag pattern in the same group. FIG. 6(b) illustrates 8 mapped antenna ports $H_1$ to 8 antenna elements 264 and 8 unmapped antenna elements 266 in a 4×4 antenna array, where rows of mapped antenna elements are blocked together and rows of unmapped antenna elements are blocked together. FIG. 6(c) illustrates 8 mapped antenna ports $H_1$ to 8 antenna elements and 8 unmapped antenna elements in an 8×2 antenna array, where mapped antenna elements are horizontally and vertically adjacent to unmapped antenna elements in a zigzag pattern.

Figure 7:
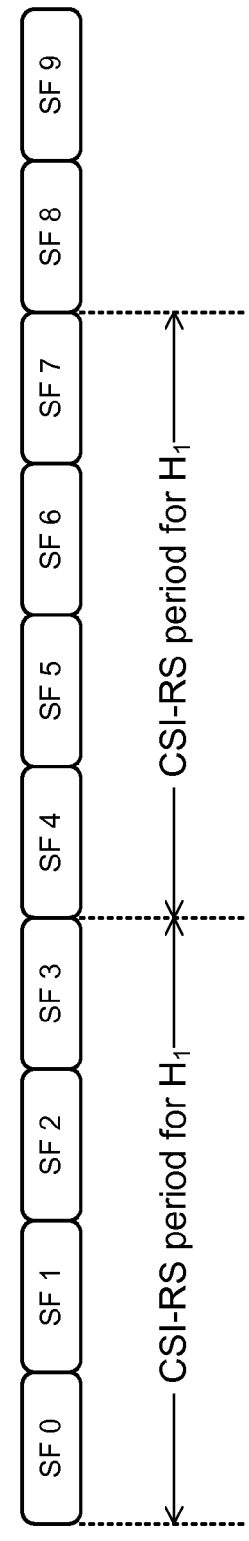
FIG. 7 illustrates a diagram of channel state information reference signals (CSI-RS) measurement and reporting period for single-stage CSI feedback mode in accordance with an example.

In one-stage beamforming training, each CSI-RS period may only be allocated to measurement and reporting of an antenna segment $H_1$, as illustrated in FIG. 7. FIG. 7 illustrates CSI-RS measurement and reporting period for single-stage CSI feedback mode, where each CSI-RS period includes four sub-frames (SF). In other example, the CSI-RS period can be longer or shorter than four sub-frames.

Figure 8:
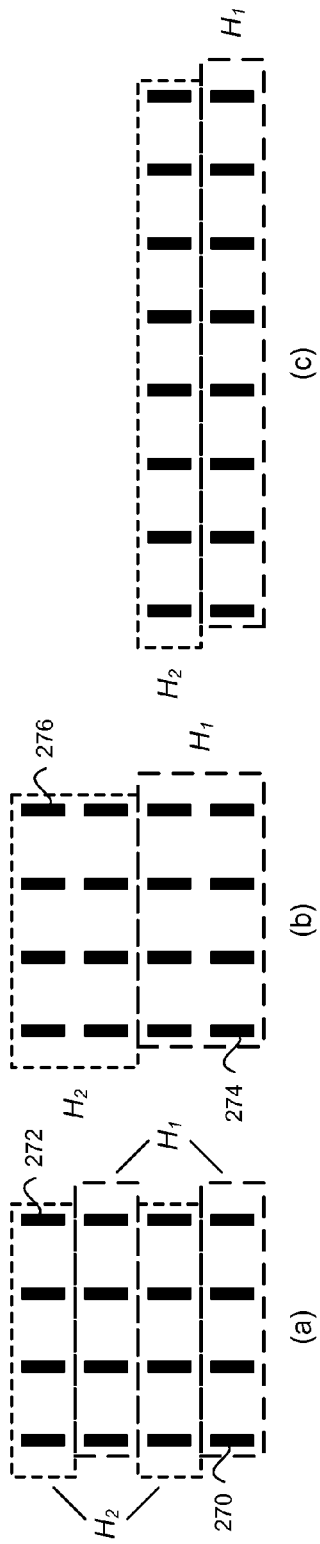
FIG. 8 illustrates a diagram of two-stage CSI feedback for co-polarized (co-pol) antennas in a 4×4 antenna array and an 8×2 antenna array in accordance with an example.
Figure 8:
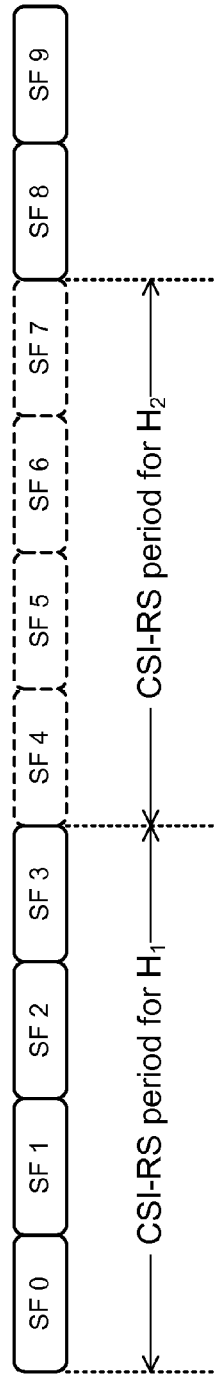

FIG. 8 illustrates two-stage CSI feedback for co-pol antennas. In two-stage beamforming training, as illustrated in FIG. 8, two independent processes of 8-port CSI-RS training can be carried out to generate a full array response. For a greater number of antennas, three and four stage beamforming training may also be used.

FIG. 8(a) illustrates 8 mapped antenna ports $H_1$ to 8 antenna elements 270 and 8 mapped antenna ports $H_2$ to another 8 antenna elements 272 in a 4×4 antenna array, where rows of mapped antenna elements for antenna ports $H_1$ are separated by rows of mapped antenna elements for antenna ports $H_2$. The mapping to antenna ports $H_1$ and $H_2$ can use various mapping, such as blocks of rows or columns, a pattern of rows or columns in a same group, or a zigzag pattern in the same group. FIG. 8(b) illustrates 8 mapped antenna ports $H_1$ to 8 antenna elements 274 and 8 mapped antenna ports $H_2$ to another 8 antenna elements 276 in a 4×4 antenna array, where rows of mapped antenna elements for antenna ports $H_1$ are blocked together and rows of mapped antenna elements for antenna ports $H_2$ are blocked together. FIG. 8(c) illustrates 8 mapped antenna ports $H_1$ to 8 antenna elements and 8 mapped antenna ports $H_2$ to another 8 antenna elements in an 8×2 antenna array, where one row of mapped antenna elements is used for antenna ports $H_1$ and another row of mapped antenna elements is used for antenna ports $H_2$.

Figure 9:
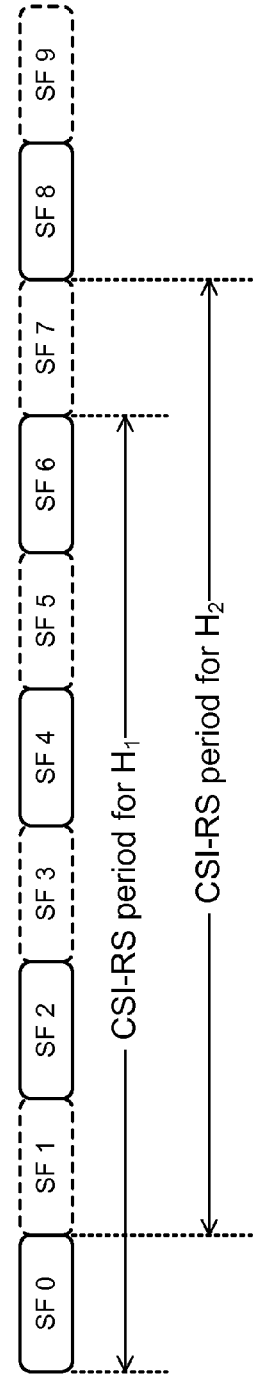
FIG. 9 illustrates a diagram of CSI measurement and reporting periods for two-stage CSI feedback mode in accordance with an example.

FIG. 9 illustrates CSI measurement and reporting periods for a two-stage CSI feedback mode. The two CSI-RS processes can either staggered (block together; FIG. 9(a)) or intertwined (interspersed or interleaved; FIG. 9(b)) over consecutive subframes (SF). Given the split nature of the CSI period in the two-stage mode, the node (e.g., eNodeB) can signal to the UE the sequence and format of the two processes, or the CSI period configuration can be pre-determined beforehand (i.e., known to the node and the UE). Two-stage beamforming training (or two-stage CSI feedback) can be used for adjacent antenna elements that are not strongly correlated, such as antennas arrays with larger spacing (e.g., 4λ of 6λ between the elements, or greater than λ).

In the illustration of the single-stage and two-stage CSI feedback modes for 16 Tx antennas, an eight transmitter (8Tx) codebook can be used to generate channel feedback in the UE and reconstruct a best precoding matrix indicator (PMI) codeword in the node (e.g., eNodeB) for the 8 mapped antenna ports $H_1$ (and $H_2$ in the two-stage mode). The 8Tx codebook can re-use an existing 8Tx codebook (e.g., LTE-A codebook) to maintain compatibility with existing UEs and specifications. Alternatively, the 8Tx codebook can use a more enhanced codebook to match specific antenna configurations for the antenna array deployed.

The PMI can be a signal fed back by the UE to support a multiple-input multiple-output (MIMO) operation. The PMI can correspond to an index of the precoder (within a codebook shared by the UE and eNodeB), which can maximize an aggregate number of data bits which can be received across all downlink spatial transmission layers.

Single-stage CSI feedback can be used for SU-MIMO and MU-MIMO. The single-stage CSI feedback mode can provide feedback reduction over the two-stage mode because one 8Tx-based CSI feedback can be used for the entire array. As a result, the precoding weights for the 16 antennas can be calculated from the partial feedback (e.g., based on 8 antennas or 8 antenna ports). Based on the antenna configuration and antenna port and/or physical antenna mapping, various processes and interpolation can be used.

Referring back to the antenna port mapping shown in FIG. 6(a) for SU-MIMO, the CSI ports can be mapped to two non-adjacent rows in the 4×4$^{4×4}$ planar array. The estimated channel obtained according to the 8Tx antenna codebook search in the UE and report back to the node can be represented by $H_1$: 4×2 (Expression 1).

$$H_1 = \begin{bmatrix} H_{1,11} & H_{1,12} & H_{1,13} & H_{1,14} \\ H_{1,31} & H_{1,32} & H_{1,33} & H_{1,34} \end{bmatrix} \quad \text{[Expression 1]}$$

The full antenna array response can be represented by Expression 2, where the $H_1$ elements in first and third rows are fed back and the missing $H_2^{H_2}$ elements in second and fourth rows can be determined or interpolated.

$$H = \begin{bmatrix} H_{1,11} & H_{1,12} & H_{1,13} & H_{1,14} \\ H_{2,21} & H_{2,22} & H_{2,32} & H_{2,24} \\ H_{1,31} & H_{1,32} & H_{1,33} & H_{1,34} \\ H_{2,41} & H_{2,42} & H_{2,43} & H_{2,44} \end{bmatrix} \quad \text{[Expression 2]}$$

A linear phase progression can be formed over the vertical elements by a phase-only interpolation of the known $H_1$ phase values. For example, the phases of the antenna elements in the first vertical column can be represented by $\angle H_{2,2i} = +(\angle H_{1,1i} + \angle H_{1,3i})/2$, i=1, 2, 3, 4 [Expression 3]. Phases of the last row elements (e.g., $\angle H_{2,4i}$, i=1, 2, 3, 4) can be obtained based on similar inter-element phase shift as the second row.

For a rank-1 transmission, a $W_{des}$: 16×1$^{W_{des}:16×1}$ desired PMI at the eNodeB can be determined. For higher ranks, the channel phase interpolation can be carried out for each received PMI, which can lead to $W_{des}$: 16×r $^{W_{des}:16×r}$ rank-r PMI. Given the desired precoding matrix $W_{des}$, the $W_{des}$ can be decomposed $^{W_{des}}$ into digital matrix V: 8×r and analog matrix F: 16×8 (i.e., $F*V=W_{des}$ [Expression 4]$^{F*V=W_{des}}$).

In the case of rank-1 SU-MIMO, a solution can be based on constraining the digital precoding matrix V for the digital precoder (210 of FIG. 5) to be the PMI feedback signaled for the 8 antenna ports (i.e., $V_{BB}=W_{8Tx}^{F*V=W_{des}}$, where $V_{BB}$ is digital baseband precoding matrix and $W_{8Tx}$ is PMI feedback signaled for the 8 Tx antenna ports).

$V_{BB}=W_{8Tx}$ The analog beamformer (240 of FIG. 5) can assume a structure based on preserving the precoding weights of the physical antennas which were used to estimate the $H_1$ channel segment. The next half of the analog beamforming matrix phase can interpolate to the remaining antenna elements. Matrix $F^F$ can be represented by Expression 5, which implies simple phase shifter for each antenna element not used in the 8-antenna ports CSI feedback.

$$F = \begin{bmatrix} I_8 \\ e^{j(\angle W_{des} - \angle V_{BB})} I_8 \end{bmatrix}$$ [Expression 5]

For r>1 ranks, a unique solution for the V and $F^{V,F}$ decomposition may not exist. By applying some constraints, a simpler solution can be determined. Examples of constraints that can be used are as follows: $V^V$ can be forced to be the PMI determined by the 8Tx CSI feedback (e.g., $V=W_{8Tx}^{V=W_{8Tx}}$). All entries of F can have $^V$ unit amplitude; and 3-bit quantization can be used for the entries of F, which can imply that F is drawn from an eight phase-shift keying (8-PSK) alphabet. For a less complex RF system, a minimum number of adders (or combiners 244 of FIG. 5) can be used for the implementation of F, which can impose sparseness on the structure of F (or the analog precoder).

Quantization is the process of mapping a large set of input values to a smaller set, such as rounding values to some unit of precision. A device or algorithmic function that performs quantization is called a quantizer. The round-off error introduced by quantization is referred to as quantization error. For example, an optimal beam may be quantized to a discrete index of the optimal beam, such as a precoding matrix indicator (PMI). The 8-PSK alphabet set can be represented as $\{\pm 1, \pm j, \pm\sqrt{1\pm j}\}$ or $\{0, \pi/4, \pi/2, 3\pi/4, \pi, 5\pi/4, 3\pi/2, 7\pi/4\}$ or 45° separation between values in a unit circle.

For r>1 ranks with constraints on the digital precoder, the analog precoding weights can be formulated as the solution to a minimization problem as represented in Expression 6.

$$\min_{F \in 8PSK} \|W_{des} - F * W_{8Tx}\|_2$$ [Expression 6]

Expression 6 can be converted to a least-squares (LS) form. Expression 4 (i.e., $F*V=W_{des}$) can be re-written as Expression 7, where $()^T$ is a matrix transpose function.

$$V^T * F^T = W_{des}^T$$ [Expression 7]

Then 16 least-square problems can be solved as shown by Expression 8, where $F_i^T$ and $W_{des,i}^T$ are the ith columns of their respective matrices.

$$V^T * F_i^T = W_{des,i}^T, i=1, \ldots, 16$$ [Expression 8]

The unconstrained solutions can be derived according to Expression 9 where $F_{ls,i}$ is a least-squared solution for each element of analog precoding matrix F.

$$F_{ls,i} = \arg \min \|V^T * F_i^T - W_{des,i}^T\|^2, i=1, \ldots, 16$$ [Expression 9]

Based on the constraints set, an actual solution can be a closest point in the 8-PSK alphabet to an unconstrained solution. In SU-MIMO, both V and $W_{des}^{F*V=W_{des}}$ can be constant-amplitude codewords. In the previous illustration, the interpolation of the analog precoding weights used LS, but in another example, other minimization solutions may also be used.

The interpolation of the digital precoding weights and analog precoding weights for the antenna port mapping shown in FIG. 6(*b*) can be solved or handled similarly to FIG. 6(*a*) previously describe with a different mapping between 8 antenna ports and physical antenna elements.

In an 8×2 antenna configuration as shown for the antenna port mapping shown in FIG. 6(*c*), a better spatial resolution in the horizontal domain can be achieved. The zigzag pattern of antenna port mapping $H_1$ can help to estimate the full array response. Again, the digital precoding weights can be obtained per an existing codebook, where $V=W_{8Tx}$, and the analog beamforming or analog precoding weights can be interpolated as the phase gaps from the two adjacent antenna elements. The phase interpolation matrix can be represented as Expression 10.

[Expression 10]

$$\Phi_{int} = \begin{bmatrix} e^{j(\phi_{12}-\Delta\phi_1)} & 1 & e^{j(\phi_{12}+\Delta\phi_{12})} & 1 & e^{j(\phi_{14}+\Delta\phi_{14})} & 1 & e^{j(\phi_{16}+\Delta\phi_{16})} & 1 \\ 1 & e^{j(\phi_{21}+\Delta\phi_{21})} & 1 & e^{j(\phi_{23}+\Delta\phi_{23})} & 1 & e^{j(\phi_{25}+\Delta\phi_{25})} & 1 & e^{j(\phi_{25}+\Delta\phi_2)} \end{bmatrix}$$

In Expression 10, the change of phase ($\Delta\phi$) terms can be the interpolated phase values based on the two adjacent horizontal array elements. Phases for the two boundary nodes (e.g., $e^{j(\Phi_{12}-\Delta\Phi_1)}$ or $e^{j(\Phi_{25}+\Delta\Phi_2)}$) can be estimated from the two near neighbors, where one neighbor is a vertical element and the other neighbor is a horizontal element. The determination of the digital precoding weights and the phase interpolation matrix can lead to the identification of $W_{des}^{F*V=W_{des}}$ and analog precoding weights for rank-r SU-MIMO similar to the illustration of solving 16 LS problems associated with FIG. 6(*a*).

Two-stage CSI feedback for SU-MIMO (with antenna port mapping shown in FIG. 8) can be used to determine digital precoding weights and analog precoding weights. Two-stage CSI feedback can provide greater precision for the digital precoding weights because interpolation may not be used. But, single-stage CSI can reduce the feedback by half from what 16 Tx antennas may normally use. In the 2-stage scheme, no feedback reduction may be used and the array response can be reported to the eNodeB in 2 CSI periods corresponding to $H_1$ and $H_2$ segments of the antenna array, as previously shown in FIG. 9. The CSI feedback for each segment can use an existing 8Tx feedback mechanism.

Figure 10:
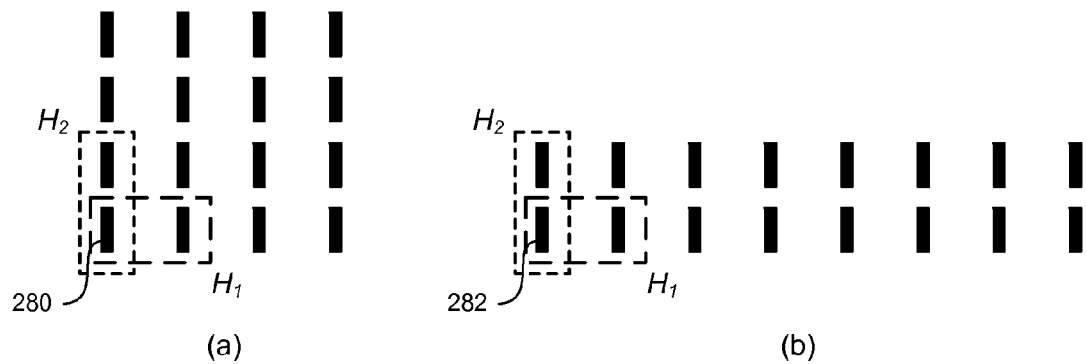
FIG. 10 illustrates a diagram of two-antenna port training for phase shift estimation between two array segments in accordance with an example.

An ideal (or desired) 16×r unconstrained baseband precoding weights ($W_{des}^{F^* V = W_{des}}$) can be derived from the two CSI feedback segments. When the array response is split in two segments, such as $H_1$ and $H_2$, a phase ambiguity can occur by combining the two responses (e.g., $H_1$ and $H_2$) because the responses do not correspond to a same time period. Different mechanisms can be used to obtain, update, and track this phase shift (to correct the phase ambiguity). For example, an infrequent 2-antenna port CSI-RS training on 2 horizontal and 2 vertical physical antennas with one element in common can be used. FIG. 10(a) illustrates 2-antenna port CSI-RS training for the antenna configuration of FIG. 8(a), and FIG. 10(b) illustrates 2-antenna port CSI-RS training for the antenna configuration of FIG. 8(c). FIG. 10 illustrates two-antenna port training for phase shift estimation between two array segments. The common element 280 and 282 between $H_1$ and $H_2$ can be used to resolve the phase ambiguity.

A similar procedure as illustrated for one-stage CSI feedback can be used to determine analog precoding F from Expression 4 (i.e., $F^*V=W_{des}$) where V may be any 8Tx codeword obtained from either $H_1$ or $H_2$.

Determination can also be made of precoding weights for MU-MIMO digital and analog beamforming. Determining MU-MIMO digital precoder weights can be similar to SU-MIMO. Derivation of rank-r MU-MIMO analog precoder weights can be similar to that of rank-r SU-MIMO with a few changes as follows. Each user (e.g., UE) can feed back CSI variables based on an existing 8Tx process according to either single-stage or two-stage CSI feedback as previously described. An ideal unconstrained PMI for each user k can be calculated based on multiple least-squared (LS) instances, denoted by $W_{des}^{(k)}$. The node (e.g., eNodeB) can identify the users to participate in the MU-MIMO based a certain scheduling algorithm, such as proportional-fair scheduling (PFS), and can determine the per-user rank, and can form the MU-MIMO channel matrix $H_{MU}$. $H_{MU}$ can be denoted as rank of $H_{MU}$ by r. For a same set of users, a form 8×r actual digital precoder can be denoted by $V_{MU}=W_{8TX}^{(MU)}$ based on the received CSI feedback of $H_1$ or $H_2$ channel segments per user. The node (e.g., eNodeB) can apply its adopted beamforming scheme, such as zero-forcing, on the channel matrix $H_{MU}$ to produce unconstrained baseband weights $W_{des}^{(MU)}$. The analog precoding weights can be derived from $F^{(MU)*}W_{8Tx}^{(MU)}=W_{des}^{(MU)}$ [Expression 11]. Expression 11 can be solved similarly to the SU-MIMO case with 16 independent LS equations.

Unlike SU-MIMO, neither $V_{MU}$ nor $W_{des}^{(MU)}$ may contain unit-amplitude entries. However, the analog beamformer can still be constrained to a PSK alphabet. In a case that 3-bit 8-PSK quantization proves inadequate for MU-MIMO, the PSK alphabet size can be increased to 16. In MU-MIMO, precoding weights can be determined to minimize inter-user interference. With 8-PSK, 8 values of phase shifting are available with 3 bits of precision. With 4-bit 16-PSK, 16 values of phase shifting are available with 4 bits of precision. Optimization of the analog precoder can occur over a PSK alphabet (e.g., 4-PSK, 8-PSK, 16-PSK, or 5-bit 32-PSK). Higher precision can generate more overhead and complexity.

An iterative identification of digital and analog precoding weights can also be used. As previously described, the digital precoding weights can be constrained and then the analog precoding weights can be determined. At the last stage of the hybrid beamforming scheme, the unconstrained analog weights can be quantized to a nearest PSK point (e.g., 8-PSK point). As a result of quantization error, the SU-MIMO inter-stream or MU-MIMO inter-user interference may not be eliminated and performance can degrade. In the illustrations for both the SU-MIMO and MU-MIMO cases, the digital precoder can be constrained to an existing codeword (e.g., $W_{8Tx}$) obtained from an 8Tx CSI procedure, which can simplify calculation of optimal analog weights. Removing this constraint on the precoding weights can allow for reducing the quantization error and maintaining orthogonality of the streams (in SU-MIMO) or the users (in MU-MIMO). Using UE-specific RS (UERS) or precoded RS for data demodulation, as provided by LTE-A transmission mode 9 (TM-9 or TM 9), can remove a need to signal precoding codewords to the UE and facilitate iterative identification of digital and analog precoding weights. As a result, the digital precoding block V can be set to any matrix other than $W_{8Tx}$.

The various scenarios for a downlink can be reflected in different transmission modes (TMs). For example, in LTE, TM 1 can use a single transmit antenna; TM 2 can use transmit diversity; TM 3 can use open loop spatial multiplexing with cyclic delay diversity (CDD); TM 4 can use closed loop spatial multiplexing; TM 5 can use multi-user MIMO (MU-MIMO); TM 6 can use closed loop spatial multiplexing using a single transmission layer; TM 7 can use beamforming with UE-specific RS; TM 8 can use single or dual-layer beamforming with UE-specific RS; and TM 9 can use a multilayer transmission to support closed-loop single user MIMO (SU-MIMO) or carrier aggregation. In an example, TM 10 can be used for coordinated multipoint (CoMP) signaling, such as joint processing (JP), dynamic point selection (DPS), and/or coordinated scheduling/coordinated beamforming (CS/CB).

Referring back to iterative identification, a first part of the iterative approach can be similar to the determination of digital precoder weights and analog precoder weights previously described (e.g., based on $V=W_{8Tx}^{V=W_{8Tx}}$). Quantization of the unconstrained analog precoding block F can results in $F^{(Q)}$. A next iteration can constrain (fix or set) analog precoding to $F^{(Q)}$ and solve a least-square problems represented by Expression 12.

$$\min_V \|W_{des} - F^{(Q)} * V\|_2 \quad \text{[Expression 12]}$$

Since $W_{des}$ can already be obtained based on zero inter-stream or inter-user interference, a final solution may not re-introduce additional interference.

In another example, the iterative solution for SU-MIMO or MU-MIMO hybrid beamforming can include the following: Calculating an unconstrained solution to $F_{ls,i}$=arg min $\|W_{8Tx}*F_i^T - W_{des,i}^{T2}\|^2$, i=1, . . . , 16 [Expression 13] (i.e., Expression 9, where $V=W_{8Tx}$). Quantizing $F_{ls}$ to $F^{(Q)}$, where $F_{ls}$ is a LS solution for F. And, re-computing a new minimization problem using Expression 12

$$\left(\text{i.e., } \min_V \|W_{des} - F^{(Q)} * V\|_2\right)$$

to obtain a best unconstrained choice for digital weights V.

Figure 11:
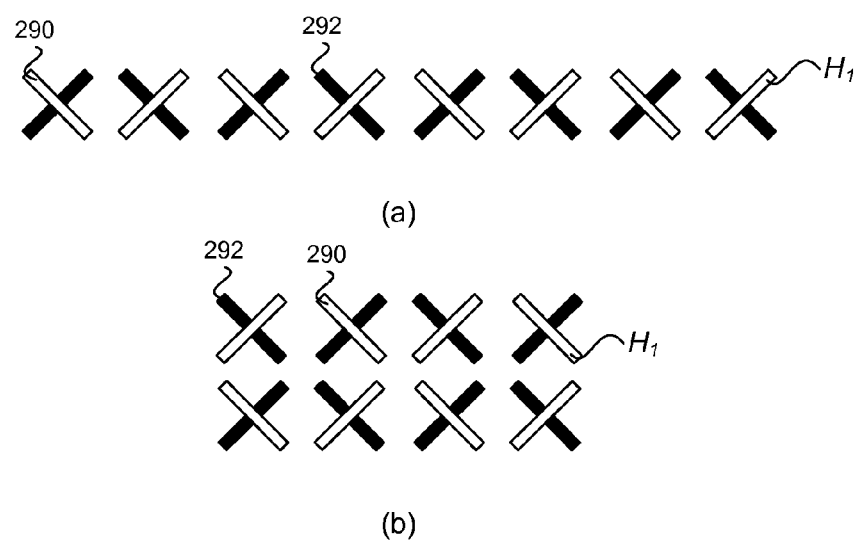
FIG. 11 illustrates a diagram of cross-polarized (cross-pol) antenna patterns for eight transmitter-based (8Tx-based) channel estimation in accordance with an example.

The determination of digital precoder weights and analog precoder weights previously described in relation to co-polarized antennas in the antenna array can also be applied to cross-polarized (x-pol) antennas in an antenna array. For x-pol antenna configurations, the CSI sub-sampling based on an existing 8Tx scheme and the single-stage CSI feedback can be implemented using a pattern, as illustrated in FIG. 11. FIG. 11 illustrates cross-polarized (cross-pol) antenna patterns for single-stage eight transmitter-based (8Tx-based) channel estimation. FIG. 11(a) illustrates 8 mapped antenna ports $H_1$ to 8 antenna elements 290 and 8 unmapped antenna elements 292 in a 16×1 x-pol antenna array. FIG. 11(b) illustrates 8 mapped antenna ports $H_1$ to 8 antenna elements 290 and 8 unmapped antenna elements 292 in an 8×2 x-pol antenna array. The digital precoder weights of unmapped antenna elements can be determined or interpolated based on the orthogonal relationship to the mapped antenna ports $H_1$. The analog beamformer weights can be obtained similar to the process previously described for co-polarized antennas. In another example, two-stage CSI feedback can be used to obtain the digital precoder weights in a process similar to the process previously described for co-polarized antennas, where antenna elements 292 can be mapped to antenna ports $H_2$.

Figure 12:
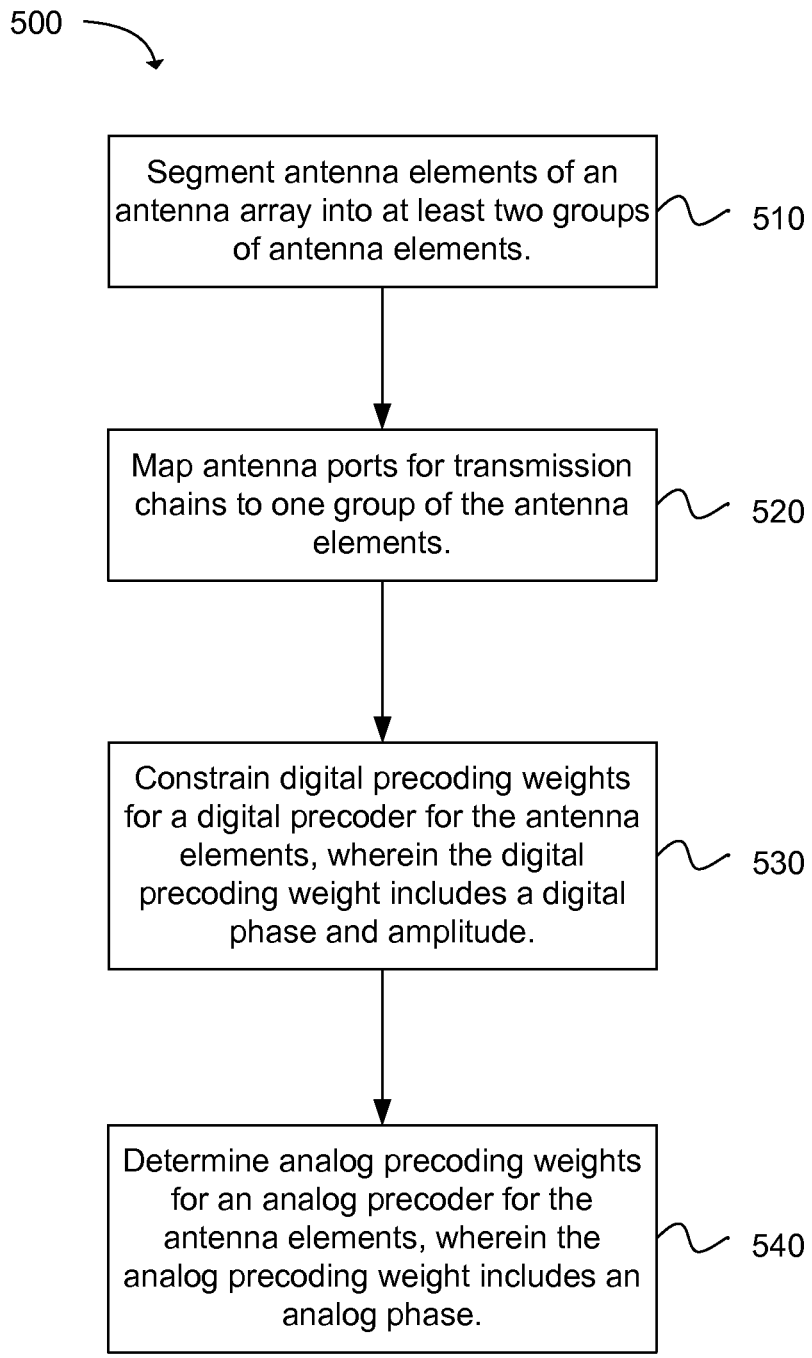
FIG. 12 depicts functionality of computer circuitry of a hybrid digital and analog beamforming device for a node (e.g., eNB) operable with an antenna array in accordance with an example.

Another example provides functionality 500 of computer circuitry of a hybrid digital and analog beamforming device for a node operable with an antenna array, as shown in the flow chart in FIG. 12. The functionality may be implemented as a method or the functionality may be executed as instructions on a machine, where the instructions are included on at least one computer readable medium or one non-transitory machine readable storage medium. The computer circuitry can be configured to segment antenna elements of an antenna array into at least two groups of antenna elements, as in block 510. The computer circuitry can be further configured to map antenna ports for transmission chains to one group of the antenna elements, as in block 520. The computer circuitry can also be configured to constrain digital precoding weights for a digital precoder for the antenna elements, wherein the digital precoding weight includes a digital phase and amplitude, as in block 530. The computer circuitry can be further configured to determine analog precoding weights for an analog precoder for the antenna elements, wherein the analog precoding weight includes an analog phase, as in block 540.

In an example, the computer circuitry configured to segment the antenna elements of the antenna array can be further configured to segment the antenna elements into blocks of rows or columns, a pattern of rows or columns in a same group, or a zigzag pattern in the same group. In another example, the computer circuitry configured to map the antenna ports for the transmission chains can be further configured to assign at least one group of the antenna elements to a channel state information reference signal (CSI-RS) feedback period. The computer circuitry configured to constrain the digital precoding weight can be further configured to: select a group of antenna elements as a feedback group and another group of antenna elements as a non-feedback group; determine the digital precoding weights for the feedback group from CSI-RS feedback from a user equipment (UE); and interpolate the digital precoding weights for the non-feedback group based on the digital precoding weights for the feedback group. In another configuration, the computer circuitry configured to constrain the digital precoding weight can be further configured to: select a group of antenna elements as a first feedback group and another group of antenna elements as a second feedback group; determine the digital precoding weights for a first feedback group from CSI-RS feedback from a user equipment (UE); determine the digital precoding weights for a second feedback group from CSI-RS feedback from the user equipment; and resolve a phase ambiguity between the digital precoding weights for the first feedback group and the digital precoding weights for the second feedback group.

In another example, the computer circuitry configured to constrain the digital precoding weight can be further configured to: reconstruct a quantized precoding matrix indicator (PMI) codeword of an eight transmitter (8Tx), four transmitter (4Tx), or two transmitter (2Tx) codebook as specified in a Third Generation Partnership Project (3GPP) Long Term Evolution (LTE) standard Release 11 based on the CSI-RS feedback from a user equipment (UE); and assign the quantized PMI codeword to the digital precoding weights. The computer circuitry configured to determine the analog precoding weights can be further configured to: solve for each analog precoding weight $F_{ls,i}^{(k)}$ based on least squares (LS) for a unconstrained solution for a rank r>1 transmission, where the unconstrained solution is represented by $F_{ls,i}^{(k)}=\arg\min\|V^{T*}F_i^T-W_{des,i}^{(k)T}\|^2$, i=1, . . . , $a_{max}$ where arg min is an argument of a minimum function, $(\ )^T$ is a transpose function, V is a digital precoding weight matrix, $F_i$ is an element of an analog precoding weight matrix, $W_{des}$ is a desired precoding matrix indicator (PMI) codeword based on CSI-RS feedback for a user k, and $a_{max}$ is a number of antenna elements in the antenna array, wherein for single user multiple-input and multiple-output (MIMO) (SU-MIMO), V and $W_{des}$ are variable-amplitude codewords, and for multiple user MIMO (MU-MIMO), V and $W_{des}$ are constant-amplitude codewords; and quantize the unconstrained solution to a closest point in a phase-shift keying (PSK) alphabet for each user k, wherein the PSK alphabet is a 2-bit 4-PSK, a 3-bit 8-PSK, or a 4-bit 16-PSK alphabet.

In another configuration, the computer circuitry configured to constrain the digital precoding weight can be further configured to: calculate each analog precoding weight $F_{ls,i}$ based on least squares (LS) for a unconstrained solution, where the unconstrained solution is represented by $F_{ls,i}=\arg\min\|W_{8Tx}^{T*}F_i^T-W_{des,i}^T\|^2$, i=1, . . . , $a_{max}$ where arg min is an argument of a minimum function, $(\ )T$ is a transpose function, W is a quantized precoding matrix indicator (PMI) codeword of an eight transmitter (8Tx) codebook based on the CSI feedback for a user k, $F_i$ is an element of an analog precoding weight matrix, Wdes is a desired PMI codeword based on CSI-RS feedback for the user k, and amax is the number of antenna elements in the antenna array; and quantize an unconstrained solution $F_{ls}$ is to $F^{(Q)}$ using a closest point in a phase-shift keying (PSK) alphabet for each user k; and calculate the digital precoding weights V by solving for $\min_V\|W_{des}-F^{(Q)}*V\|_2$, i=1, . . . , $a_{max}$ to reduce quantization error.

In another example, the computer circuitry can be further configured to: precode a signal for amplitude or phase using the digital precoder with the digital precoding weights to generate a digital precoded signal; and phase shift the digital precoded signal using a radio frequency (RF) phase shifter with the analog precoding weights. A number of antennas associated with the antenna elements can be greater than eight antennas, and the antennas can be co-polarized antennas or cross-polarized antennas. The node can include a base station (BS), a Node B (NB), an evolved Node B (eNB), a baseband unit (BBU), a remote radio head (RRH), a remote radio equipment (RRE), a remote radio unit (RRU), or a central processing module (CPM).

Figure 13:
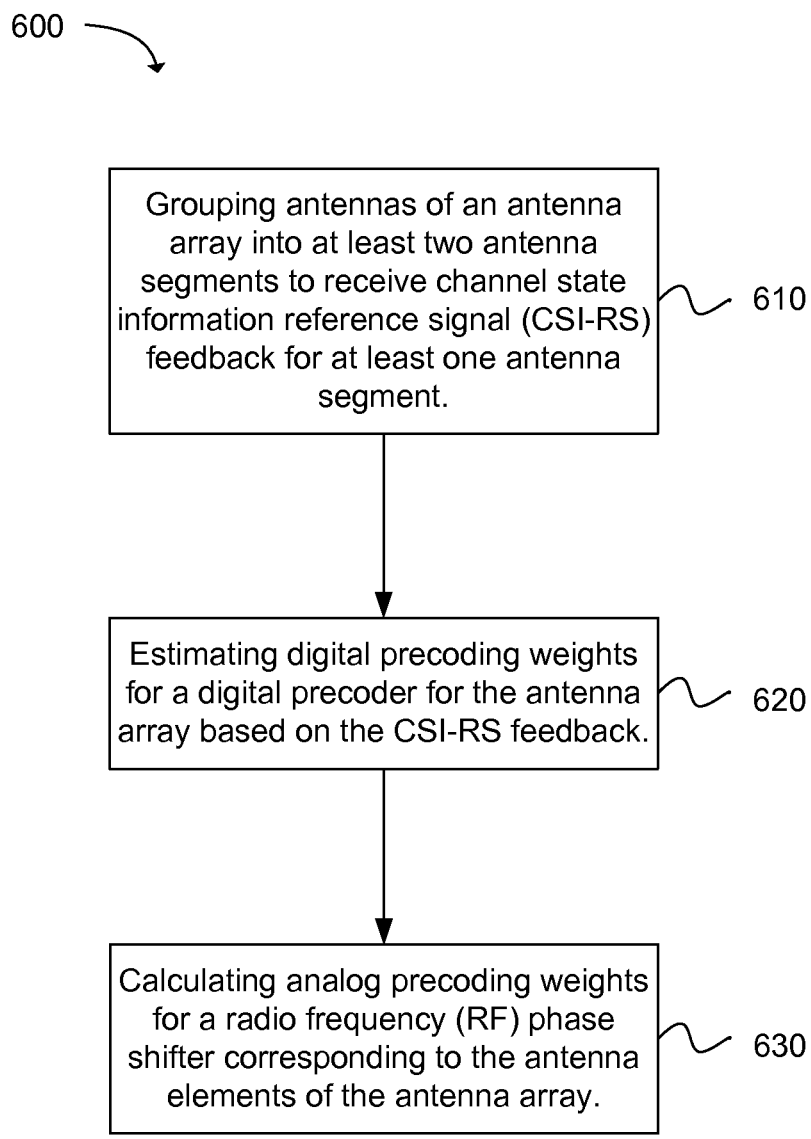
FIG. 13 depicts a flow chart of a method for hybrid digital and analog beamforming for an antenna array at a node in accordance with an example.

Another example provides a method 600 for hybrid digital and analog beamforming for an antenna array at a node, as shown in the flow chart in FIG. 13. The method may be executed as instructions on a machine, computer circuitry, or a processor for the node (e.g., eNB), where the instructions are included on at least one computer readable medium or one non-transitory machine readable storage medium. The method includes the operation of grouping antennas of an antenna array into at least two antenna segments to receive channel state information reference signal (CSI-RS) feedback for at least one antenna segment, as in block 610. The operation of estimating digital precoding weights for a digital precoder for the antenna array based on the CSI-RS feedback follows, as in block 620. The next operation of the method can be calculating analog precoding weights for a radio frequency (RF) phase shifter corresponding to the antenna elements of the antenna array, as in block 630.

In an example, the operation of grouping the antennas of the antenna array can further include mapping each antenna port for a radio frequency (RF) chain to an antenna for an antenna set for the CSI-RS feedback. A number of the antennas in the antenna array can exceed a number of RF chains.

In another example, the method can further include: one-stage beamforming training of CSI-RS for an antenna segment H1 for each CSI period. The antenna segment comprises a group antennas as blocks of rows or columns, a pattern of rows or columns in a same antenna segment, or a zigzag pattern within the same antenna segment. The operation of estimating the digital precoding weights can further include: determining the digital precoding weights for the antenna segment $H_1$ based on $H_1$ CSI-RS feedback; and phase-only interpolating the digital precoding weights for an antenna segment without corresponding CSI-RS feedback based on the digital precoding weights for the antenna segment $H_1$. The operation of estimating the digital precoding weights can further include: determining unconstrained analog precoding weights based on a minimization of a least squares (LS) form; and selecting a constrained analog precoding weights to a closest point in a phase-shift keying (PSK) alphabet.

In another configuration, the method can further include: multiple-stage beamforming training of CSI-RS for at least a first antenna segment $H_1$ and a second antenna segment $H_2$ for multiple CSI periods. The operation of estimating the digital precoding weights can further include: determining the digital precoding weights for the first antenna segment $H_1$ based on $H_1$ CSI-RS feedback; and determining the digital precoding weights for the second antenna segment $H_2$ based on $H_2$ CSI-RS feedback. The method can further include: tracking a phase shift between the $H_1$ CSI-RS feedback and the $H_2$ CSI-RS feedback, which operation can further include: mapping antenna ports to a row of antennas in the antenna array, where the row of antennas is associated with the first antenna segment $H_1$; mapping antenna ports to a column of antennas in the antenna array, where the column of antennas is associated with the second antenna segment $H_2$, and where the row and the column share a same antenna; and resolving a phase ambiguity between the $H_1$ CSI-RS feedback and the $H_2$ CSI-RS feedback using the same antenna.

In another example, the operation of calculating the analog precoding weights can further include: calculating each of the analog precoding weights based on minimization of an unconstrained least squares (LS) solution; and quantizing the unconstrained LS solution to a constrained analog precoding weights using a closest point in a phase-shift keying (PSK) alphabet. The method can further include re-computing the digital precoding weights by solving a minimization problem using the constrained analog precoding weights to reduce quantization error.

Figure 14:
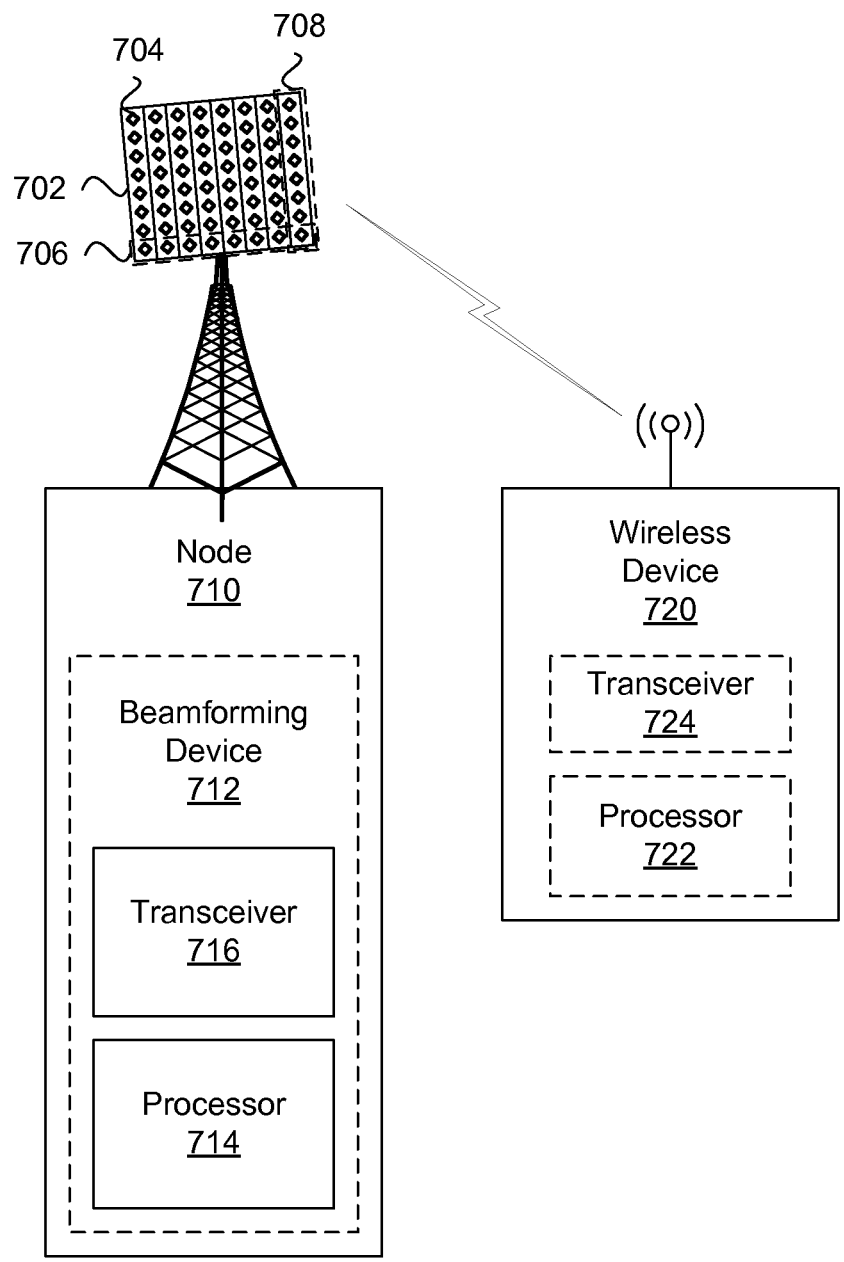
FIG. 14 illustrates a block diagram of a node (e.g., eNB) and wireless device (e.g., UE) in accordance with an example.

FIG. 14 illustrates an example node 710 (e.g., eNB) and an example wireless device 720 (e.g., UE). The node can include an antenna array 702 that includes rows 706 and columns 708 of antenna radiation elements (or antennas or antenna elements) 704. The node can include a beamforming device 712. The beamforming device or the node can be configured to communicate with the wireless device (e.g., UE). The beamforming device can include a processor 714 and a transceiver 716. The processor 714 and/or transceiver 716 can include computer circuitry for hybrid digital and analog beamforming, as described in 500 of FIG. 12. The processor 714 and/or transceiver 716 can be configured for hybrid digital and analog beamforming for the antenna array, as described in 600 of FIG. 13.

In another example, the processor 714 and/or transceiver 716 of the node can be configured for hybrid digital and analog beamforming for an antenna array. In an example, the processor 714 can be configured to: group antennas of an antenna array into at least two antenna segments based on channel state information reference signal (CSI-RS) feedback for at least one antenna segments; estimate digital precoding weights for a digital precoder based on the CSI-RS feedback; and calculate analog precoding weights for a radio frequency (RF) phase shifter corresponding to the antenna elements.

The antenna array 702 can have an inter-element spacing of the antenna elements of approximately $\lambda/2$ or less for one-stage CSI feedback, where $\lambda$ is the wavelength of a signal for a radio band transmitted by the node. In another configuration, the antenna array can have an inter-element spacing of the antenna elements of approximately $2\lambda$ or greater for two-stage CSI feedback. The antenna array can include more than eight antenna elements.

The transceiver 716 can include a digital precoder (210 of FIG. 5) and a radio frequency (RF) phase shifter (220 of FIG. 5). The digital precoder can use configurable digital precoding weights operable to precode a signal for amplitude or phase and generate a digital precoded signal. Each of the digital precoding weights can include a digital phase and amplitude. The RF phase shifter can use configurable analog precoding weights operable to phase shift the digital precoded signal for beamforming. Each of the analog precoding weights can include an analog phase.

The processor 714 can be further configured to: map each antenna port for a radio frequency (RF) chain to an antenna for an antenna set for the CSI-RS feedback; and train CSI-RS using one-stage beamforming for an antenna segment $H_1$ for each CSI period. In another configuration, the processor can be further configured to: map each antenna port for a RF chain to an antenna for an antenna set for the CSI-RS feedback; and train CSI-RS using multiple-stage beamforming for at least a first antenna segment $H_1$ and a second antenna segment $H_2$ for multiple CSI periods.

In another example, the processor 714 can be further configured to: constrain digital precoding weights V; and determine analog precoding weights F based on a desired precoding matrix indicator (PMI) codeword $W_{des}$ and CSI-RS feedback from a user equipment (UE), where $F*V=W_{des}$. In another configuration, the processor can be further configured to: constrain the digital precoding weights V; determine the analog precoding weights F based on a desired precoding matrix indicator (PMI) codeword $W_{des}$ and CSI-RS feedback from a user equipment (UE), wherein $F*V=W_{des}$; and interpolate modified digital precoding weights V using the determined analog precoding weights F.

In another example, for multiple user multiple-input and multiple-output (MIMO) (MU-MIMO), the processor 714 can be further configured to: calculate an unconstrained precoding matrix indicator (PMI) codeword for each user based on multiple least squared instances; identify users to participate in MU-MIMO base on a scheduling algorithm, determine per-user rank, and generate an MU-MIMO channel matrix $H_{MU}$; set $V_{MU}=W_{8Tx}^{(MU)}$ based on CSI feedback, where $V_{MU}$ is a digital precoding weight matrix for MU-MIMO; generate unconstrained desired baseband weights $W_{des}^{(MU)}$ by applying a beamforming process on the MU-MIMO channel matrix $H_{MU}$; and derive the analog precoding weights from $F^{(MU)}*W_{8Tx}^{(MU)}=W_{des}^{(MU)}$ using a least squares (LS) solution, where $F^{(MU)}$ is an analog precoding weight matrix for MU-MIMO and $W_{8Tx}^{(MU)}$ is a quantized PMI codeword of an eight transmitter (8Tx) codebook for MU-MIMO.

The wireless device 720 (e.g., UE) can include a transceiver 724 and a processor 722. The wireless device (i.e., device) can be configured to receive a channel state information reference signal (CSI-RS) from the node, and transmit CSI-RS feedback to the note based on the received CSI-RS in a feedback period.

Figure 15:
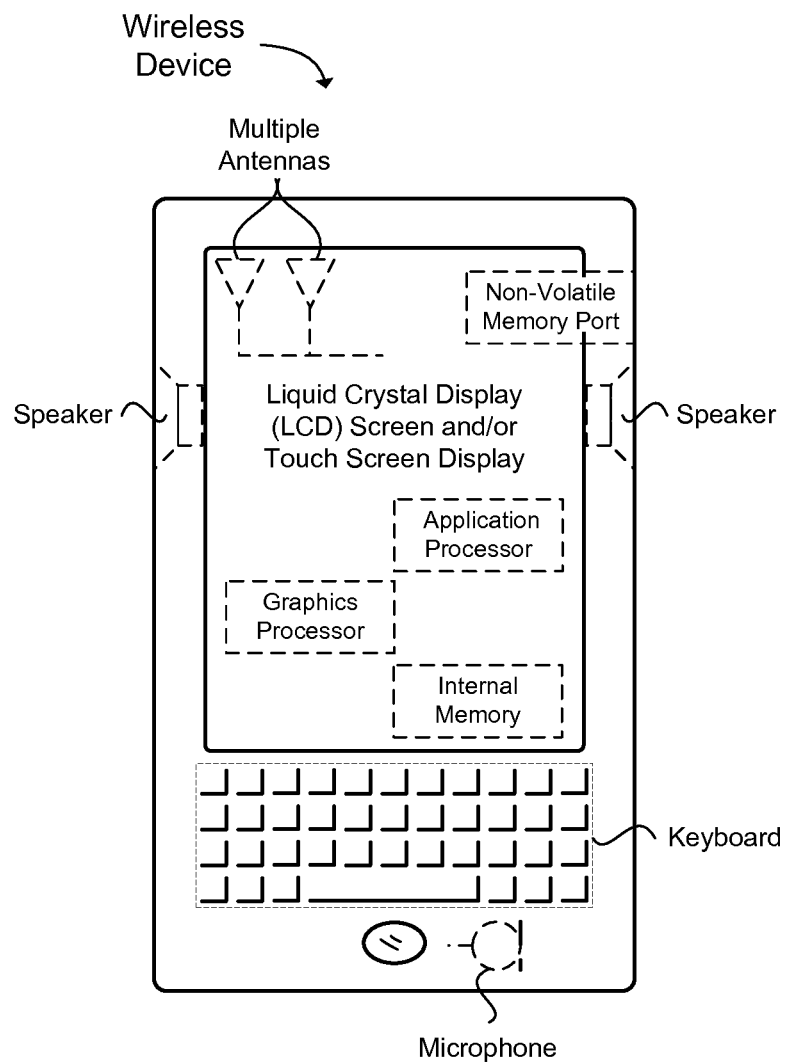
FIG. 15 illustrates a diagram of a wireless device (e.g., UE) in accordance with an example.

FIG. 15 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 15 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention.

Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A hybrid digital and analog beamforming device for a node operable with an antenna array, having computer circuitry configured to:
   segment antenna elements of an antenna array into at least two groups of antenna elements;
   map antenna ports for transmission chains to one group of the antenna elements;
   constrain digital precoding weights for a digital precoder for the antenna elements, wherein the digital precoding weight includes a digital phase and amplitude;
   determine analog precoding weights for an analog precoder for the antenna elements, wherein the analog precoding weight includes an analog phase;
   assign at least one group of the antenna elements to a channel state information reference signal (CSI-RS) feedback period;
   select a group of antenna elements as a feedback group and another group of antenna elements as a non-feedback group;
   determine the digital precoding weights for the feedback group from CSI-RS feedback from a user equipment (UE); and
   interpolate the digital precoding weights for the non-feedback group based on the digital precoding weights for the feedback group.

2. The computer circuitry of claim 1, wherein computer circuitry configured to segment the antenna elements of the antenna array is further configured to:
   segment the antenna elements into blocks of rows or columns, a pattern of rows or columns in a same group, or a zigzag pattern in the same group.

3. The computer circuitry of claim 1, wherein computer circuitry configured to constrain the digital precoding weight is further configured to:
   select a group of antenna elements as a first feedback group and another group of antenna elements as a second feedback group;
   determine the digital precoding weights for a first feedback group from CSI-RS feedback from a user equipment (UE);
   determine the digital precoding weights for a second feedback group from CSI-RS feedback from the user equipment; and
   resolve a phase ambiguity between the digital precoding weights for the first feedback group and the digital precoding weights for the second feedback group.

4. The computer circuitry of claim 1, wherein computer circuitry configured to constrain the digital precoding weight is further configured to:
   reconstruct a quantized precoding matrix indicator (PMI) codeword of an eight transmitter (8Tx), four transmitter (4Tx), or two transmitter (2Tx) codebook as specified in a Third Generation Partnership Project (3GPP) Long Term Evolution (LTE) standard Release 11 based on the CSI-RS feedback from a user equipment (UE); and
   assign the quantized PMI codeword to the digital precoding weights.

5. The computer circuitry of claim 1, wherein computer circuitry configured to determine the analog precoding weights is further configured to:
   solve for each analog precoding weight $F_{ls,i}^{(k)}$ based on least squares (LS) for a unconstrained solution for a rank r>1 transmission, where the unconstrained solution is represented by $F_{ls,i}^{(k)} = \arg \min \|V^{T*}F_i^T - W_{des,i}^{(k)T}\|^2$, i=1, ..., $a_{max}$ where arg min is an argument of a minimum function, $(\ )^T$ is a transpose function, V is a digital precoding weight matrix, $F_i$ is an element of an analog precoding weight matrix, $W_{des}$ is a desired precoding matrix indicator (PMI) codeword based on CSI-RS feedback for a user k, and $a_{max}$ is a number of antenna elements in the antenna array, wherein for single user multiple-input and multiple-output (MIMO) (SU-MIMO), V and $W_{des}$ are variable-amplitude codewords, and for multiple user MIMO (MU-MIMO), V and W des are constant-amplitude codewords; and
   quantize the unconstrained solution to a closest point in a phase-shift keying (PSK) alphabet for each user k, wherein the PSK alphabet is a 2-bit 4-PSK, a 3-bit 8-PSK, or a 4-bit 16-PSK alphabet.

6. The computer circuitry of claim 1, wherein computer circuitry configured to constrain the digital precoding weight is further configured to:
   calculate each analog precoding weight $F_{ls,i}$ based on least squares (LS) for a unconstrained solution, where the unconstrained solution is represented by $F_{ls,i} = \arg \min \|W_{8Tx}^{T*}F_i^T - W_{des,i}^T\|^2$, i=1, ..., $a_{max}$ where arg min is an argument of a minimum function, $(\ )^T$ is a transpose function, W is a quantized precoding matrix indicator (PMI) codeword of an eight transmitter (8Tx) codebook based on the CSI feedback for a user k, $F_i$ is an element of an analog precoding weight matrix, $W_{des}$ is a desired PMI codeword based on CSI-RS feedback for the user k, and $a_{max}$ is the number of antenna elements in the antenna array; and quantize an unconstrained solution $F_{ls}$ to $F^{(Q)}$ using a closest point in a phase-shift keying (PSK) alphabet for each user k; and calculate the digital precoding weights V by solving for $\min_V \|W_{des} - F^{(Q)} * V\|_2$, $i=1, \ldots, a_{max}$ to reduce quantization error.

7. The computer circuitry of claim 1, wherein the computer circuitry is further configured to:

precode a signal for amplitude or phase using the digital precoder with the digital precoding weights to generate a digital precoded signal; and phase shift the digital precoded signal using a radio frequency (RF) phase shifter with the analog precoding weights.

8. The computer circuitry of claim 1, wherein a number of antennas associated with the antenna elements is greater than eight antennas, and the antennas are co-polarized antennas or cross-polarized antennas, and the node can include a base station (BS), a Node B (NB), an evolved Node B (eNB), a baseband unit (BBU), a remote radio head (RRH), a remote radio equipment (RRE), a remote radio unit (RRU), or a central processing module (CPM).

9. A method for hybrid digital and analog beamforming for an antenna array at a node, comprising:

grouping antennas of an antenna array into at least two antenna segments to receive channel state information reference signal (CSI-RS) feedback for at least one antenna segment;

estimating digital precoding weights for a digital precoder for the antenna array based on the CSI-RS feedback;

calculating analog precoding weights for a radio frequency (RF) phase shifter corresponding to the antenna elements of the antenna array;

one-stage beamforming training of CSI-RS for an antenna segment $H_1$ for each CSI period, wherein the antenna segment comprises a group antennas as blocks of rows or columns, a pattern of rows or columns in a same antenna segment, or a zigzag pattern within the same antenna segment;

wherein estimating the digital precoding weights further comprises:

determining the digital precoding weights for the antenna segment $H_1$ based on $H_1$ CSI-RS feedback; and phase-only interpolating the digital precoding weights for an antenna segment without corresponding CSI-RS feedback based on the digital precoding weights for the antenna segment $H_1$.

10. The method of claim 9, wherein grouping the antennas of the antenna array further comprises:

mapping each antenna port for a radio frequency (RF) chain to an antenna for an antenna set for the CSI-RS feedback.

11. The method of claim 9, wherein calculating the analog precoding weights further comprises:

determining unconstrained analog precoding weights based on a minimization of a least squares (LS) form; and selecting a constrained analog precoding weights to a closest point in a phase-shift keying (PSK) alphabet.

12. The method of claim 9, further comprising:

multiple-stage beamforming training of CSI-RS for at least a first antenna segment $H_1$ and a second antenna segment $H_2$ for multiple CSI periods;

wherein estimating the digital precoding weights further comprises:

determining the digital precoding weights for the first antenna segment $H_1$ based on $H_1$ CSI-RS feedback; and determining the digital precoding weights for the second antenna segment $H_2$ based on $H_2$ CSI-RS feedback.

13. The method of claim 9, wherein:

calculating the analog precoding weights further comprises:

calculating each of the analog precoding weights based on minimization of an unconstrained least squares (LS) solution; and quantizing the unconstrained LS solution to a constrained analog precoding weights using a closest point in a phase-shift keying (PSK) alphabet; and further comprising:

re-computing the digital precoding weights by solving a minimization problem using the constrained analog precoding weights to reduce quantization error.

14. At least one non-transitory machine readable storage medium comprising a plurality of instructions adapted to be executed to implement the method of claim 9.

15. The method of claim 10, wherein a number of the antennas in the antenna array exceeds a number of RF chains.

16. The method of claim 12, further comprising:

tracking a phase shift between the $H_1$ CSI-RS feedback and the $H_2$ CSI-RS feedback, which further comprises:

mapping antenna ports to a row of antennas in the antenna array, wherein the row of antennas is associated with the first antenna segment $H_1$;

mapping antenna ports to a column of antennas in the antenna array, wherein the column of antennas is associated with the second antenna segment $H_2$, and wherein the row and the column share a same antenna; and resolving a phase ambiguity between the $H_1$ CSI-RS feedback and the $H_2$ CSI-RS feedback using the same antenna.

17. A node configured for hybrid digital and analog beamforming for an antenna array, comprising:

a processor to:

group antennas of an antenna array into at least two antenna segments based on channel state information reference signal (CSI-RS) feedback for at least one antenna segments;

estimate digital precoding weights for a digital precoder based on the CSI-RS feedback;

calculate analog precoding weights for a radio frequency (RF) phase shifter corresponding to the antenna elements; and constrain digital precoding weights V, and determine analog precoding weights F based on a desired precoding matrix indicator (PMI) codeword $W_{des}$ and CSI-RS feedback from a user equipment (UE), wherein $F*V=W_{des}$; or constrain the digital precoding weights V, determine the analog precoding weights F based on a desired precoding matrix indicator (PMI) codeword $W_{des}$ and CSI-RS feedback from a user equipment (UE), wherein $F*V=W_{des}$, and interpolate modified digital precoding weights V using the determined analog precoding weights F; or calculate an unconstrained precoding matrix indicator (PMI) codeword for each user based on multiple least squared instances;
identify users to participate in MU-MIMO base on a scheduling algorithm;
determine per-user rank;
generate an MU-MIMO channel matrix $H_{MU}$;
set $V_{MU}=W_{8Tx}^{(MU)}$ based on CSI feedback, where $V_{MU}$ is a digital precoding weight matrix for MU-MIMO;
generate unconstrained desired baseband weights $W_{des}^{(MU)}$ by applying a beamforming process on the MU-MIMO channel matrix $H_{MU}$; and
derive the analog precoding weights from $F^{(MU)}*W_{8Tx}^{(MU)}=W_{des}^{(MU)}$ using a least squares (LS) solution, where $F^{(MU)}$ is an analog precoding weight matrix for MU-MIMO and $W_{8Tx}^{(MU)}$ is a quantized PMI codeword of an eight transmitter (8Tx) codebook for MU-MIMO.

18. The node of claim 17, further comprising:
an antenna array with inter-element spacing of the antenna elements of approximately $\lambda/2$ or less for one-stage CSI feedback, wherein $\lambda$ is the wavelength of a signal for a radio band transmitted by the node; or
an antenna array with inter-element spacing of the antenna elements of approximately $2\lambda$ or greater for two-stage CSI feedback;
wherein the antenna array includes more than eight antenna elements.

19. The node of claim 17, wherein:
the processor is further configured to:
map each antenna port for a radio frequency (RF) chain to an antenna for an antenna set for the CSI-RS feedback; and
train CSI-RS using one-stage beamforming for an antenna segment $H_1$ for each CSI period, or
train CSI-RS using multiple-stage beamforming for at least a first antenna segment $H_1$ and a second antenna segment $H_2$ for multiple CSI periods.

20. The node of claim 18, further comprising:
a transceiver including:
a digital precoder with configurable digital precoding weights operable to precode a signal for amplitude or phase and generate a digital precoded signal, wherein each of the digital precoding weights includes a digital phase and amplitude; and
a radio frequency (RF) phase shifter with configurable analog precoding weights operable to phase shift the digital precoded signal for beamforming, wherein each of the analog precoding weights includes an analog phase.

\* \* \* \* \*